US012278949B2

(12) United States Patent
Zhang et al.

(10) Patent No.: US 12,278,949 B2
(45) Date of Patent: *Apr. 15, 2025

(54) QUANTIZATION PROPERTIES OF ADAPTIVE IN-LOOP COLOR-SPACE TRANSFORM FOR VIDEO CODING

(71) Applicants: Beijing Bytedance Network Technology Co., Ltd., Beijing (CN); Bytedance Inc., Los Angeles, CA (US)

(72) Inventors: Li Zhang, San Diego, CA (US); Jizheng Xu, San Diego, CA (US); Kai Zhang, San Diego, CA (US); Hongbin Liu, Beijing (CN); Weijia Zhu, San Diego, CA (US); Yue Wang, Beijing (CN)

(73) Assignees: BEIJING BYTEDANCE TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,426

(22) Filed: May 22, 2023

(65) Prior Publication Data

US 2023/0291894 A1    Sep. 14, 2023

Related U.S. Application Data

(63) Continuation of application No. 17/737,260, filed on May 5, 2022, now Pat. No. 11,671,591, which is a
(Continued)

(30) Foreign Application Priority Data

Nov. 7, 2019    (WO) ............... PCT/CN2019/116280

(51) Int. Cl.
H04N 19/105    (2014.01)
H04N 19/176    (2014.01)
(Continued)

(52) U.S. Cl.
CPC ......... *H04N 19/105* (2014.11); *H04N 19/176* (2014.11); *H04N 19/186* (2014.11); *H04N 19/189* (2014.11)

(58) Field of Classification Search
CPC .......................... H04N 19/105; H04N 19/176
See application file for complete search history.

(56) References Cited

U.S. PATENT DOCUMENTS 9,912,925 B2    3/2018  Ye
9,955,174 B2    4/2018  Ye
(Continued)

FOREIGN PATENT DOCUMENTS

CN    104509113 A    4/2015
CN    105308959 A    2/2016
(Continued)

OTHER PUBLICATIONS

Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001, 2019.
(Continued)

Primary Examiner — Irfan Habib
(74) Attorney, Agent, or Firm — Conley Rose, P.C.

(57) ABSTRACT

A method of video processing includes determining, for a conversion between a video component of a video comprising a current video block and a bitstream representation of the video, that a first coding tool is used based on a rule for the current video block; and performing the conversion according to the determining, wherein the first coding tool
(Continued)

includes transforming a representation of a visual signal between two color spaces, and where the rule specifies that a first quantization parameter (QP) offset for a luma channel of the current video block is equal to K1 and a second QP offset for a first chroma channel of the current video block is K1+O, where K1 and O are integers.

20 Claims, 23 Drawing Sheets

Related U.S. Application Data continuation of application No. PCT/CN2020/126962, filed on Nov. 6, 2020.

(51) Int. Cl.
 *H04N 19/186* (2014.01)
 *H04N 19/189* (2014.01)

(56) References Cited

U.S. PATENT DOCUMENTS

| | | | |
|---|---|---|---|
| 10,057,578 | B2 | 8/2018 | Rapaka |
| 10,116,937 | B2 | 10/2018 | Li |
| 10,142,642 | B2 | 11/2018 | Zhang |
| 10,154,286 | B2 | 12/2018 | He |
| 10,171,833 | B2 | 1/2019 | Li |
| 10,390,029 | B2 | 8/2019 | Ye |
| 10,440,340 | B2 | 10/2019 | Ye |
| 10,462,439 | B2 | 10/2019 | He |
| 10,469,847 | B2 | 11/2019 | Xiu |
| 10,638,158 | B2 * | 4/2020 | Boisson ............... H04N 19/593 |
| 10,666,976 | B2 | 5/2020 | Huang |
| 10,687,069 | B2 * | 6/2020 | Li ........................ H04N 19/70 |
| 10,887,576 | B2 * | 1/2021 | Drazic ................. H04N 13/15 |
| 11,064,206 | B2 * | 7/2021 | Zhang ................ H04N 19/157 |
| 11,153,562 | B2 * | 10/2021 | Zhang ................ H04N 19/154 |
| 11,317,091 | B2 * | 4/2022 | Kotra .................. H04N 19/186 |
| 11,412,235 | B2 * | 8/2022 | Li ........................ H04N 19/176 |
| 11,722,667 | B2 * | 8/2023 | Zhang ................ H04N 19/176 375/240.16 |
| 11,778,233 | B2 | 10/2023 | Zhang et al. |
| 11,924,472 | B2 * | 3/2024 | Deng .................. H04N 19/105 |
| 2005/0259730 | A1 | 11/2005 | Sun |
| 2006/0222254 | A1 | 10/2006 | Zandi |
| 2008/0031518 | A1 | 2/2008 | Song |
| 2013/0114694 | A1 | 5/2013 | Chen |
| 2014/0003489 | A1 | 1/2014 | Hannuksela |
| 2014/0219346 | A1 | 8/2014 | Ugur |
| 2015/0264374 | A1 | 9/2015 | Xiu |
| 2015/0264404 | A1 | 9/2015 | Hannuksela |
| 2015/0358631 | A1 * | 12/2015 | Zhang ................ H04N 19/176 375/240.16 |
| 2016/0080751 | A1 * | 3/2016 | Xiu ..................... H04N 19/157 375/240.02 |
| 2016/0100168 | A1 | 4/2016 | Rapaka |
| 2016/0100175 | A1 | 4/2016 | Laroche et al. |
| 2016/0261884 | A1 | 9/2016 | Li |
| 2016/0330457 | A1 | 11/2016 | Ye |
| 2016/0360198 | A1 | 12/2016 | Chang |
| 2016/0360205 | A1 | 12/2016 | Chang |
| 2017/0105011 | A1 | 4/2017 | Chen |
| 2017/0150176 | A1 | 5/2017 | Zhang |
| 2017/0318301 | A1 | 11/2017 | Li |
| 2017/0359595 | A1 | 12/2017 | Zhang |
| 2018/0160126 | A1 * | 6/2018 | Andersson ........... H04N 19/147 |
| 2018/0262776 | A1 * | 9/2018 | Seifi .................... G06T 7/557 |
| 2018/0278967 | A1 | 9/2018 | Kerofsky |
| 2019/0356925 | A1 | 11/2019 | Ye |
| 2019/0379870 | A1 | 12/2019 | Ye |
| 2020/0169732 | A1 | 5/2020 | Li |
| 2020/0244991 | A1 | 7/2020 | Li |
| 2020/0267395 | A1 | 8/2020 | Li |
| 2020/0275111 | A1 | 8/2020 | Zhao |
| 2020/0288172 | A1 | 9/2020 | Huang |
| 2020/0296398 | A1 | 9/2020 | Zhao |
| 2020/0296420 | A1 | 9/2020 | Karczewicz |
| 2020/0396467 | A1 | 12/2020 | Lai |
| 2022/0070460 | A1 * | 3/2022 | Ikonin ................. H04N 19/132 |
| 2022/0159301 | A1 | 5/2022 | Zhang |
| 2022/0191447 | A1 | 6/2022 | Zhang |
| 2022/0264120 | A1 * | 8/2022 | Wang .................... H04N 19/59 |
| 2022/0368898 | A1 * | 11/2022 | Zhu ...................... H04N 11/046 |
| 2022/0394288 | A1 * | 12/2022 | Li ........................ H04N 19/187 |

FOREIGN PATENT DOCUMENTS

| | | |
|---|---|---|
| CN | 105960802 A | 9/2016 |
| CN | 106063263 A | 10/2016 |
| CN | 106105203 A | 11/2016 |
| CN | 106254870 A | 12/2016 |
| CN | 106464881 A | 2/2017 |
| CN | 107079150 A | 8/2017 |
| CN | 107079157 A | 8/2017 |
| CN | 109565599 A | 4/2019 |
| CN | 114009024 B | 2/2022 |
| EP | 3104606 A1 | 12/2016 |
| GB | 2593543 A | 9/2021 |
| JP | 2017005688 A | 1/2017 |
| WO | 2013070703 A1 | 5/2013 |
| WO | 2016040865 A1 | 3/2016 |
| WO | 2016048834 A1 | 3/2016 |
| WO | 2018045332 A1 | 3/2018 |
| WO | 2019006300 A1 | 1/2019 |
| WO | 2019069950 A1 | 4/2019 |
| WO | 2019240539 A1 | 12/2019 |
| WO | 2020009758 A1 | 1/2020 |
| WO | 2020017513 A1 | 1/2020 |

OTHER PUBLICATIONS https://vcgit.hhi.fraunhofer.de/jvet/VVCSoftware_VTM/tags/VTM-5.0, Jul. 21, 2022.

Lu et al. "CE12: Mapping Functions {Test CE12-1 and CE12-2)," Joint Video Experts Team (JVET) of ITU-T SG 16 WP 3 and 1SO/IEC JTC 1/SC 29/WG 11 13th Meeting: Marrakech, MA, Jan. 9-18, 2019, document JVET-M0427, 2019.

De-Luxian-Hernandez et al. "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0102, 2019.

Pfaff et al. "CE3: Affine Linear Weighted Intra Prediction {CE3-4.1, CE3-4.2)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0217, 2019.

Said et al. "CE5: Per-Context CABAG Initialization with Single Window {Test 5.1.4)," Joint Video Experts Team {JVET of ITU-T SG 16 WP 3 and 1SO/IEC JTC 1/SC 29/WG 11, 13th Meeting, Marrakech, MA, Jan. 9-18, 2019, documen JVET-M0413, 2019.

"Information Technology—High Efficiency Coding and Media Delivery in Heterogeneous Environments—Part 2: High Efficiency Video Coding" Apr. 20, 2018, ISO/DIS 23008, 4th Edition.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

JEM-7.0: https://jvet.hhi.fraunhofer.de/svn/svn_HMJEMSoftware/tags/ HM-16.6-JEM-7.0, Jul. 21, 2022.

Zhang et al. "Adaptive Color-Space Transform in HEVC Screen Content Coding," IEEE Journal on Emerging and Selected Topics in Circuits and Systems, 2016.

Bross et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001, 2019.

Zhao et al. "An Implementation of Adaptive Color Transform in WC," Joint Video Experts Team (JVET) of ITU-T SG 16 WP 3 and

(56) References Cited

OTHER PUBLICATIONS

ISO/IEC JTC 1/SC 29/WG 11 14th Meeting: Geneva, CH, Mar. 19-27, 2019, document JVET-N0368, 2019.
Kiu et al. "Support of Adaptive Color Transform for 444 Video Coding in WC," Joint Video Experts Team {JVET) of ITU-T SG 16 WP 3 and ISO/IEC JTC 1/SC 29/WG 11 16th Meeting: Geneva, CH, Oct. 1-11, 2019, document JVET-P0517, 2019.
Karczewicz et al. "JVET AHG Report: Tool Evaluation (AHG1)," Joint Video Exploration Team (JVET) of ITU-T SG 16 WP 3 and ISO/IEC JTC 1/SC 29/WG 11 8th Meeting: Macao, CN, Oct. 18-25, 2017, document JVET-H0001, 2017.
He et al. "AHG12: On Top-to-Bottom Tile Partitioning," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0066, 2019.
Marpe et al. "An Adaptive Color Transform Approach and its Application in 4:4:4 Video Coding," 14th European Signal Processing Conference (EUSIPCO 2006), Florence Italy, Sep. 4-8, 2006.
Zhang et al. "Adaptive Color-Space Transform for HEVC Screen Content Coding," 2015 Data Compression Conference, 2015.
Document: JVET-N0421-v1, Zhang, K., et al., "Non-CE:Unsymmetrical quadtree partitioning," Joint Video Experts Team (JVET) of ITU-T SG 16 WP 3 and ISO/IEC JTC 1/SC 29/WG 11 14th Meeting: Geneva, CH, Mar. 19-27, 2019, 2 pages.
Notice of Allowance from U.S. Appl. No. 17/556,689 dated Aug. 10, 2022.
International Search Report and Written Opinion from International Patent Application No. PCT/CN2020/097368 dated Sep. 24, 2020 (10 pages).
International Search Report and Written Opinion from International Patent Application No. PCT/CN2020/097370 dated Sep. 27, 2020 (10 pages).
International Search Report and Written Opinion from International Patent Application No. PCT/CN2020/097372 dated Aug. 18, 2020 (10 pages).
International Search Report and Written Opinion from International Patent Application No. PCT/CN2020/126962 dated Feb. 1, 2021 (15 pages).
Non Final Office Action from U.S. Appl. No. 17/556,689 dated Mar. 24, 2022.
Non-Final Office Action dated Aug. 31, 2022, 17 pages, U.S. Appl. No. 17/737,260, filed May 5, 2022.
Notice of Allowance dated Jan. 9, 2023, 11 pages, U.S. Appl. No. 17/737,260, filed May 5, 2022.
ITU-T "Series H: Audiovisual and Multimedia Systems Infrastructure of audiovisual services—Coding of moving video; High efficiency video coding," Rec. ITU-T H.265 | ISO/IEC 23008-2 (in force edition), Nov. 2019, 712 pages.
JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.
JVET-Q2002-v3, Chen, J., et al., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
Suehring, K., VTM software: https://vcgit.hhi.fraunhofer.de/jvet/VVCSoftware_VTM.git, Dec. 20, 2022, 3 pages.
JVET-N0280, Bross, B., et al., "CE8: Residual Coding for Transform Skip Mode (CE8-4.3a, CE8-4.3b, CE8-4.4a, and CE8-4.4b)," Joint Video Experts Team (JVET) of ITU-T SG 16 WP 3 and ISO/IEC JTC 1/SC 29/WG 11 14th Meeting: Geneva, CH, Mar. 19-27, 2019, 4 pages.
JVET-M0413, Said, A., et al., "CE5: Per-context CABAC initialization with single window (Test 5.1.4)," Joint Video Experts Team (JVET) of ITU-T SG 16 WP 3 and ISO/IEC JTC 1/SC 29/WG 11 13th Meeting: Marrakech, MA, Jan. 9-18, 2019, 3 pages.
JVET-O0081-v2, Tsukuba, T., et al., "CE8: Chroma Transform Skip (CE8-3.2)," Joint Video Experts Team (JVET) of ITU-T SG 16 WP 3 and ISO/IEC JTC 1/SC 29/WG 11 15th Meeting: Gothenburg, SE, Jul. 3-12, 2019, 10 pages.
Document: JVET-O0122-v3, Karczewicz, M., et al., "CE7: Sign context, level mapping, and bitplane coding for TS residual coding (CE7-3.7, CE7-3.8, CE7-3.9, CE7-3.10, and CE7-3.11)," Joint Video Experts Team (JVET) of ITU-T SG 16 WP 3 and ISO/IEC JTC 1/SC 29/WG 11 15th Meeting: Gothenburg, SE, Jul. 3-12, 2019, 27 pages.
Document: JVET-O0122-v2, Karczewicz, M., et al., "CE7: Sign context, level mapping, and bitplane coding for TS residual coding (CE7-3.7, CE7-3.8, CE7-3.9, CE7-3.10, and CE7-3.11)," Joint Video Experts Team (JVET) of ITU-T SG 16 WP 3 and ISO/IEC JTC 1/SC 29/WG 11 15th Meeting: Gothenburg, SE, Jul. 3-12, 2019, 22 pages.
JVET-O0556, Karczewicz, M., et al., "CE7-related: Alternative method to RDPCM with TS level mapping," Joint Video Experts Team (JVET) of ITU-T SG 16 WP 3 and ISO/IEC JTC 1/SC 29/WG 11 15th Meeting: Gothenburg, SE, Jul. 3-12, 2019, 3 pages.
JVET-O0512, Keating, S., et al., "Non-CE3: CCLM Coding bug fix," Joint Video Experts Team (JVET) of ITU-T SG 16 WP 3 and ISO/IEC JTC 1/SC 29/WG 11 15th Meeting: Gothenburg, SE, Jul. 3-12, 2019, 3 pages.
JVET-N1001-v1, Bross, B., et al., "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, 350 pages.
JVET-O0246-v1, Seregin, V., et al., "AHG17: Separate luma and chroma Alf Aps types," Joint Video Experts Team (JVET) of ITU-T SG 16 WP 3 and ISO/IEC JTC 1/SC 29/WG 11 15th Meeting: Gothenburg, SE, Jul. 3-12, 2019, 4 pages.
JCTVC-J0072r1, Hannuksela, M., et al., "AHG9 High-Level Syntax: APS loss detection," Joint Collaborative Team on Video Coding (JCT-VC) of ITU-T SG 16 WP 3 and ISO/IEC JTC 1/SC 29/WG 11 10th Meeting: Stockholm, SE, Jul. 11-20, 2012, 4 pages.
JVET-P0437-r1, Karczewicz, M., et al., CE7: Sign context, level mapping, and bitplane coding for TS residual coding (CE7-3.7, CE7-3.8, CE7-3.9, CE7-3.10, and CE7-3.11), Joint Video Experts Team (JVET) of ITU-T SG 16 WP 3 and ISO/IEC JTC 1/SC 29/WG 11 15th Meeting: Gothenburg, SE, Jul. 3-12, 2019, 22 pages.
Document: JVET-Q2001-v9, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 17 pages.
Document: JVET-P2001-v3, Bross, B., et al., "Versatile Video Coding (Draft 7)," Joint Video Experts Team (JVET) of ITU-T SG 16 WP 3 and 1S0/IEC JTC 1/SC 29/WG 11 16th Meeting: Geneva, CH, Oct. 1-11, 2019, 15 p.
Document: JVET-Q0117-v1, Wang, Y.K., et al., "AHG9: Cleanups on parameter sets," Joint Video Experts Team (JVET) of ITU-T SG 16 WP 3 and ISO/IEC JTC 1/SC 29/WG 11 17th Meeting: Brussels, BE, Jan. 7-17, 2020, 9 pages.
Document: JVET-R0070-v1, Wang, Y.K., et al., "AHG9: On repetition and update of non-VCL data units," Joint Video Experts Team (JVET) of ITU-T SG 16 WP 3 and ISO/IEC JTC 1/SC 29/WG 11 18th Meeting: by teleconference, Apr. 15-24, 2020, 4 pages.
Foreign Communication From a Related Counterpart Application, PCT Application No. PCT/CN2021/084869, English Translation of International Search Report dated Jun. 25, 2021, 12 pages.
Foreign Communication From a Related Counterpart Application, PCT Application No. PCT/CN2021/084870, English Translation of International Search Report dated Jun. 30, 2021, 13 pages.
Foreign Communication From A Related Counterpart Application, European Application No. 21781004.3, Partial Supplementary European Search Report dated Jun. 23, 2023, 14 pages.
Non-Final Office Action from U.S. Appl. No. 17/955,719 dated Apr. 27, 2023, 18 pages.
Japanese Office Action from Japanese Application No. 2022-559412 dated Apr. 9, 2024, 16 pages. With English Translation.

(56) References Cited

OTHER PUBLICATIONS

Final Office Action from U.S. Appl. No. 17/955,719 dated Mar. 29, 2024.
Japanese Office Action from Japanese Patent Application No. 2022-559412 dated Sep. 17, 2024, 7 pages.
Non-Final Office Action from U.S. Appl. No. 18/517,737 dated Jun. 18, 2024, 21 pages.
Chinese Notice of Allowance from Chinese Patent Application No. 202080045542.4 dated Jul. 29, 2024, 7 pages.
Non-Final Office Action from U.S. Appl. No. 18/472,093 dated May 14, 2024, 30 pages.
Final Office Action from U.S. Appl. No. 18/472,093 dated Sep. 13, 2024, 16 pages.

* cited by examiner

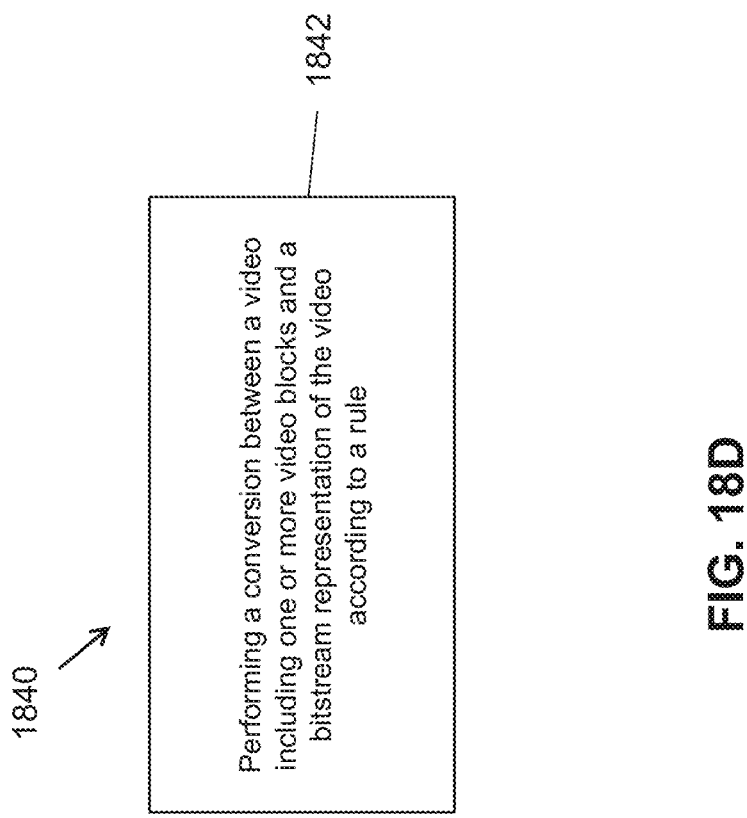

QUANTIZATION PROPERTIES OF ADAPTIVE IN-LOOP COLOR-SPACE TRANSFORM FOR VIDEO CODING

CROSS REFERENCE TO RELATED APPLICATIONS

This application is a continuation of U.S. patent application Ser. No. 17/737,260, filed on May 5, 2022, which is a continuation of International Patent Application No. PCT/CN2020/126962, filed on Nov. 6, 2020, which claims the priority to and benefits of International Patent Application No. PCT/CN2019/116280, filed on Nov. 7, 2019. All the aforementioned patent applications are hereby incorporated by reference in their entireties.

TECHNICAL FIELD

The present disclosure is directed generally to video coding and decoding technologies.

BACKGROUND

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the next generation Versatile Video Coding (VVC) standard targeting at 50% bitrate reduction compared to HEVC.

SUMMARY

Using the disclosed video coding, transcoding or decoding embodiments, video encoders or decoders can handle virtual boundaries of coding tree blocks to provide better compression efficiency and simpler implementations of coding or decoding tools.

In one example aspect, a method of video processing is disclosed. The method includes determining, for a conversion between a video component of a video comprising a current video block and a bitstream representation of the video, that an adaptive color space transformation (ACT) tool is used based on a rule for the current video block; and performing the conversion according to the determining, and wherein the rule specifies to use a same constant quantization parameter (QP) offset for each of one or more color component of the current video block.

In another example aspect, another method of video processing is disclosed. The method includes determining, for a conversion between a video block of a video and a bitstream representation of the video, whether and/or how to apply a deblocking process according to a rule; and performing the conversion based on the determining, wherein the rule specifies that the deblocking process depends on i) an enablement status of an adaptive color space transformation (ACT) in which a representation of a visual signal is transformed between two color spaces, or ii) a color space used for representing samples of the video.

In another example aspect, another method of video processing is disclosed. The method includes determining, for a conversion between a current video block of a video and a coded representation of the video, to perform a color transform due to use an adaptive color space transformation (ACT) coding tool; and performing the conversion according to the determining.

In another example aspect, another method of video processing is disclosed. The method includes performing a conversion between a video including one or more video blocks and a bitstream representation of the video according to a rule, wherein the rule specifies that, for a video block coded using a transform skip mode, a lowest allowed quantization parameter (QP) is independent of an applicability of an adaptive color space transformation (ACT) tool to the video block.

In another example aspect, another method of video processing is disclosed. The method includes performing a conversion between a video including one or more video blocks and a bitstream representation of the video according to a rule, wherein the rule specifies that, for a video block coded using a transform skip mode, a lowest allowed quantization parameter (QP) depends on color channels.

In another example aspect, another method of video processing is disclosed. The method includes determining that a rule of exclusion is applicable to a conversion between a video region of a video and a bitstream representation of the video, wherein the rule of exclusion specifies that the conversion disallows using a coding tool and a joint coding of chrominance residuals (JCCR) tool together for the video region; and performing the conversion based on the determining.

In another example aspect, another method of video processing is disclosed. The method includes determining, for a conversion between a video unit of a video and a bitstream representation of the video, an applicability of a coding tool and/or whether to signal an indication of usage and/or information of the coding tool based on a quantization parameter used for the conversion of the video unit; and performing the conversion based on the determining.

In yet another example aspect, a video encoding apparatus configured to perform an above-described method is disclosed.

In yet another example aspect, a video decoder that is configured to perform an above-described method is disclosed.

In yet another example aspect, a machine-readable medium is disclosed. The medium stores code which, upon execution, causes a processor to implement one or more of the above-described methods.

The above and other aspects and features of the disclosed technology are described in greater detail in the drawings, the description and the claims.

BRIEF DESCRIPTION OF THE DRAWINGS

FIG. 18A to 18F are flowcharts for example methods of video processing based on some embodiments of the present disclosure.

DETAILED DESCRIPTION

Figure 1:
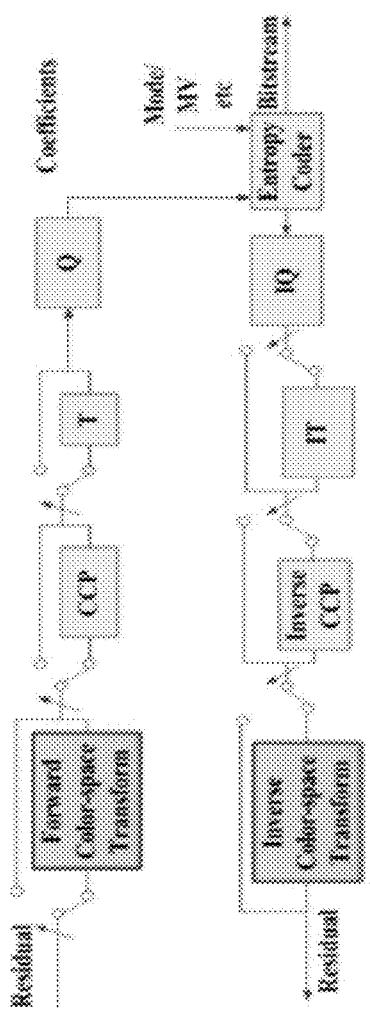
FIG. 1 shows an example of encoding flow with adaptive color-space transform (ACT).

Section headings are used in the present disclosure to facilitate case of understanding and do not limit the embodiments disclosed in a section to only that section. Furthermore, while certain embodiments are described with reference to Versatile Video Coding (VVC) or other specific video codecs, the disclosed embodiments are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

1. Brief Summary

This disclosure is related to video coding technologies. Specifically, it is related to interactions of adaptive color-space transform with other tools in video coding. It may be applied to the existing video coding standard like HEVC, or the standard (e.g., VVC) to be finalized. It may be also applicable to future video coding standards or video codec.

2. Video Coding Introduction

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/ HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1. Adaptive Color-Space Transform (ACT) in HEVC Screen Content Coding (SCC) Extensions In the HEVC SCC Extensions, several tools have been proposed and employed to improve the SCC efficiency under the HEVC framework. For example, to exploit the repeated patterns in SC, an intra block copying (IBC) scheme was adopted. Similar to the motion compensation scheme used for inter pictures, the IBC mode searches for the repeated patterns in the already reconstructed region of the current picture. Another direction to improve SCC is to reduce the inter-color-component redundancy for the RGB/ YCbCr sequences in the 4:4:4 chroma format.

The cross-component prediction (CCP) technology signals a weighting parameter index for each chroma color component of a transform unit. CCP provides good coding efficiency improvements with limited added complexity and thus, it was adopted to the HEVC Range Extensions and is part of HEVC Ver. 2, which specifies descriptions of Range Extensions, and other Extensions.

In order to further exploit inter-color-components correlation for SCC, an in-loop adaptive color-space transform (ACT) for HEVC SCC Extensions was employed. The basic idea of ACT is to adaptively convert the prediction residual into a color space with reduced redundancy among the three-color components. Before and after that, the signal follows the existing coding path in HEVC Range Extensions. To keep the complexity as low as possible, only one additional color-space (i.e., RGB to YCgCo-R inverse transform) is considered, which can be easily implemented with shift and add operations.

2.1.1. Transforms Used in ACT

For lossy coding, the YCgCo transform is used while its reversible variant, i.e., YCgCo-R, is used for lossless coding.

The forward and inverse YCgCo transform process is listed as below: taking a pixel in (R, G, B) color format as an example:

$$\text{Forward: } \begin{bmatrix} Y \\ Cg \\ Co \end{bmatrix} = \frac{1}{4} * \begin{bmatrix} 1 & 2 & 1 \\ -1 & 2 & -1 \\ 2 & 0 & -2 \end{bmatrix} \begin{bmatrix} R \\ G \\ B \end{bmatrix}$$

$$\text{Inverse: } \begin{bmatrix} R \\ G \\ B \end{bmatrix} = \begin{bmatrix} 1 & -2 & 1 \\ 1 & 1 & 0 \\ 1 & -1 & -1 \end{bmatrix} \begin{bmatrix} Y \\ Cg \\ Co \end{bmatrix}$$

Different from YCgCo transform which could be implemented by a matrix multiplication, the reversible color-space transform, i.e., YCgCo-R, used in ACT can only be performed in lifting-based operation as follows:

$$\text{Forward: } \begin{aligned} Co &= R - B \\ t &= B + (Co \gg 1) \\ Cg &= G - t \\ Y &= t + (Cg \gg 1) \end{aligned}$$

-continued $$\text{Inverse}: \begin{array}{l} t = Y - (Cg \gg 1) \\ G = Cg + t \\ B = t - (Co \gg 1) \\ R = Co + b \end{array}$$

2.1.2. Usage of ACT

For each transform unit (TU), a flag may be signaled to indicate the usage of color-space transform. In addition, for intra coded coding units (CUs), ACT is enabled only when the chroma and luma intra prediction modes are the same, i.e., the chroma block is coded with direct mode (DM mode).

Figure 2:
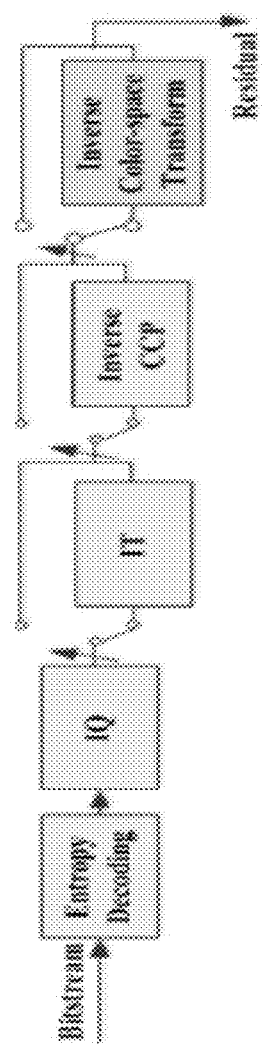
FIG. 2 shows an example of a decoding flow with ACT.

FIG. 1 shows the block diagram of the proposed method at the encoder with the residual signal derived from intra/inter prediction as the input. The proposed function blocks, including forward and reverse color-space transforms, are located in the coding loop and highlighted. As shown in FIG. 1, after the intra- or inter-prediction process (including the prediction process for IBC mode), it is determined whether to perform the forward color-space transform. With the introduced color-space transform, the color space of the input signal may be converted to YCgCo with less correlation among the three-color components. After that, the original coding flow, such as CCP, integer transform (i.e., T in FIG. 1), if applicable, quantization (i.e., Q in FIG. 1) and entropy coding processes, is further invoked in order. Meanwhile, during the reconstruction or decoding process as depicted in FIG. 2, after the conventional inverse quantization (i.e., IQ in FIG. 2), inverse transform (i.e., IT in FIG. 2) and inverse CCP, if applicable, the inverse color transform is invoked to convert the coded residual back to the original color space. It should be noted that, the color-space conversion process is applied to the residual signal instead of the reconstruction signal. With such a method, the decoder only needs to perform the inverse color space transform process which could keep the complexity increase as low as possible. Furthermore, in ACT, fixed color space transforms, i.e., YCgCo and YCgCo-R, are utilized regardless of input color spaces.

2.1.3. ACT in VVC

A version of ACT was adopted into VVC draft 7 and VVC test model (VTM)-7.0. The ACT is based on CU instead of TU. The core transforms used for the color space conversions are kept the same as that used for the HEVC. Specifically, the following forward and inverse YCgCo color transform matrices, as described as follows, are applied.

$$\begin{bmatrix} C_0' \\ C_1' \\ C_2' \end{bmatrix} = \begin{bmatrix} 2 & 1 & 1 \\ 2 & -1 & -1 \\ 0 & -2 & 2 \end{bmatrix} \begin{bmatrix} C_0 \\ C_1 \\ C_2 \end{bmatrix} / 4 \quad \begin{bmatrix} C_0 \\ C_1 \\ C_2 \end{bmatrix} = \begin{bmatrix} 1 & 1 & 0 \\ 1 & -1 & -1 \\ 1 & -1 & 1 \end{bmatrix} \begin{bmatrix} C_0' \\ C_1' \\ C_2' \end{bmatrix}$$

Additionally, to compensate the dynamic range change of residuals signals before and after color transform, the QP adjustments of (−5, −5, −3) are applied to the transform residuals.

On the other hand, as shown in above mentioned transform, the forward and inverse color transforms need to access the residuals of all three components. Correspondingly, in the proposed implementation, the ACT is disabled in the following two scenarios where not all residuals of three components are available.

Separate-tree partition: when separate-tree is applied, luma and chroma samples inside one coding tree unit (CTU) are partitioned by different structures. This results in that the CUs in the luma-tree only contains luma component and the CUs in the chroma-tree only contains two chroma components.

Intra sub-partition prediction (ISP): the ISP sub-partition is only applied to luma while chroma signals are coded without splitting. In the current ISP design, except the last ISP sub-partitions, the other sub-partitions only contain luma component.

2.2. Local Illumination Compensation in JEM

Local illumination compensation (LIC) is based on a linear model for illumination changes, using a scaling factor a and an offset b. And it is enabled or disabled adaptively for each inter-mode coded CU.

Figure 3:
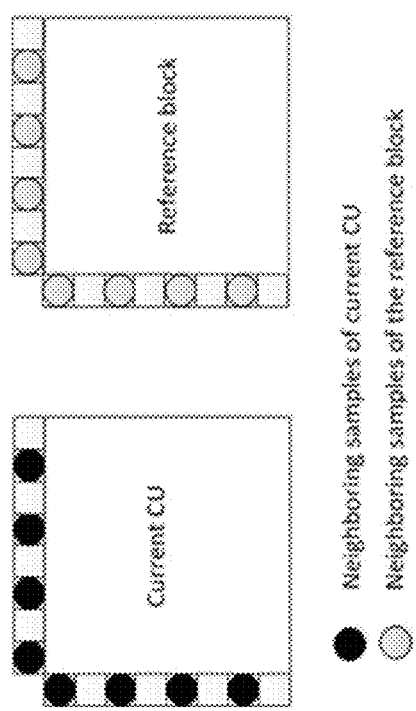
FIG. 3 shows an example of neighboring samples used for deriving IC parameters.

When LIC applies for a CU, a least square error method is employed to derive the parameters a and b by using the neighboring samples of the current CU and their corresponding reference samples. More specifically, as illustrated in FIG. 3, the subsampled (2:1 subsampling) neighboring samples of the CU and the corresponding samples (identified by motion information of the current CU or sub-CU) in the reference picture are used.

2.2.1. Derivation of Prediction Blocks

The IC parameters are derived and applied for each prediction direction separately. For each prediction direction, a first prediction block is generated with the decoded motion information, then a temporary prediction block is obtained via applying the LIC model. Afterwards, the two temporary prediction blocks are utilized to derive the final prediction block.

When a CU is coded with merge mode, the LIC flag is copied from neighboring blocks, in a way similar to motion information copy in merge mode; otherwise, an LIC flag is signaled for the CU to indicate whether LIC applies or not.

When LIC is enabled for a picture, additional CU level rate-distortion (RD) check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM.

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.3. Inter Prediction Methods in VVC

There are several new coding tools for inter prediction improvement, such as adaptive motion vector difference resolution (AMVR) for signaling motion vector difference (MVD), affine prediction mode, triangular prediction mode (TPM), advanced temporal motion vector prediction (ATMVP), generalized bi-prediction (GBI), bi-directional optical flow (BIO).

2.3.1. Coding Block Structure in VVC

In VVC, a Quad-Trec (QT)/Binary-Tree (BT)/Ternary Tree (TT) structure is adopted to divide a picture into square or rectangle blocks.

Besides QT/BT/TT, separate tree (a.k.a. dual coding tree) is also adopted in VVC for I-frames. With separate tree, the coding block structure are signaled separately for the luma and chroma components.

2.4. In-Loop Reshaping (ILR) in JVET-M0427

The basic idea of ILR is to convert the original (in the first domain) signal (prediction/reconstruction signal) to a second domain (reshaped domain).

The in-loop luma reshaper is implemented as a pair of look-up tables (LUTs), but only one of the two LUTs need to be signaled as the other one can be computed from the signaled LUT. Each LUT is a one-dimensional, 10-bit, 1024-entry mapping table (1D-LUT). One LUT is a forward LUT, FwdLUT, that maps input luma code values $Y_i$ to altered values $Y_r$: $Y_r$=FwdLUT[$Y_i$]. The other LUT is an inverse LUT, InvLUT, that maps altered code values $Y_r$ to $\hat{Y}_i$: $\hat{Y}_i$=InvLUT[$Y_r$]. ($\hat{Y}_i$ represents the reconstruction values of $Y_i$).

2.4.1. Piece-Wise Linear (PWL) Model

Conceptually, PWL is implemented in the following way:

Let x1, x2 be two input pivot points, and y1, y2 be their corresponding output pivot points for one piece. The output value y for any input value x between x1 and x2 can be interpolated by the following equation:

$$y=((y2-y1)/(x2-x1))*(x-x1)+y1$$

In fixed point implementation, the equation can be rewritten as:

$$y=((m*x+2^{FP\_PREC-1})>>FP\_PREC)+c$$

where m is scalar, c is an offset, and FP_PREC is a constant value to specify the precision.

Note that in CE-12 software, the PWL model is used to precompute the 1024-entry FwdLUT and InvLUT mapping tables; but the PWL model also allows implementations to calculate identical mapping values on-the-fly without precomputing the LUTs.

2.4.2. Luma Reshaping

Test 2 of the in-loop luma reshaping (i.e., CE12-2 in the proposal) provides a lower complexity pipeline that also eliminates decoding latency for block-wise intra prediction in inter slice reconstruction. Intra prediction is performed in reshaped domain for both inter and intra slices.

Figure 4:
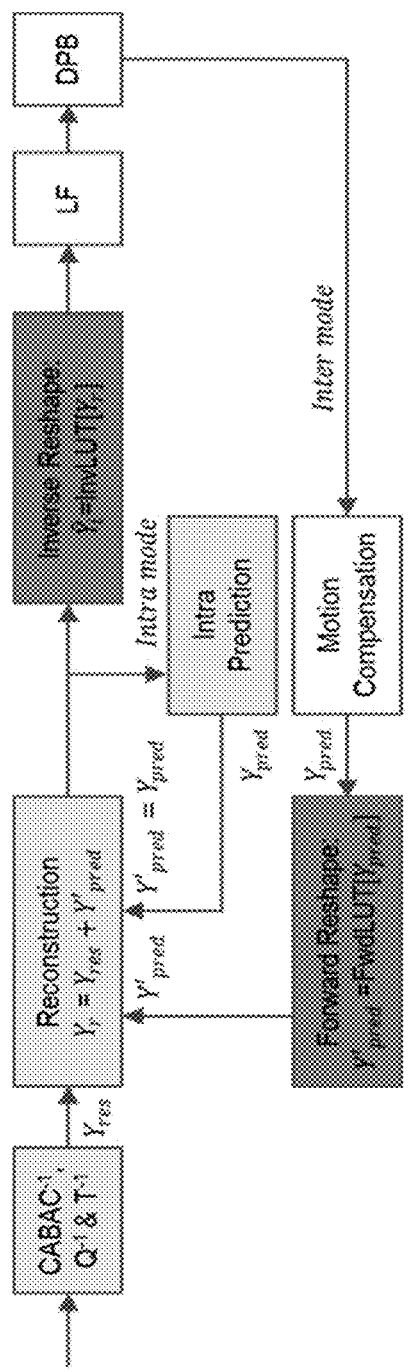
FIG. 4 shows an example flowchart of decoding flow with reshaping.

Intra prediction is always performed in reshaped domain regardless of slice type. With such arrangement, intra prediction can start immediately after previous TU reconstruction is done. Such arrangement can also provide a unified process for intra mode instead of being slice dependent. FIG. 4 shows the block diagram of the CE12-2 decoding process based on mode.

CE12-2 also tests 16-piece PWL models for luma and chroma residue scaling instead of the 32-piece PWL models of CE12-1.

FIG. 4 shows a flowchart of decoding flow with reshaping.

Inter slice reconstruction with in-loop luma reshaper in CE12-2, in which lightly shaded blocks indicate signal in reshaped domain: luma residue; intra luma predicted; and intra luma reconstructed 2.4.3. Luma-Dependent Chroma Residue Scaling Luma-dependent chroma residue scaling is a multiplicative process implemented with fixed-point integer operation. Chroma residue scaling compensates for luma signal interaction with the chroma signal. Chroma residue scaling is applied at the TU level. More specifically, the following applies:

For intra, the reconstructed luma is averaged.

For inter, the prediction luma is averaged.

The average is used to identify an index in a PWL model. The index identifies a scaling factor cScaleInv. The chroma residual is multiplied by that number.

It is noted that the chroma scaling factor is calculated from forward-mapped predicted luma values rather than reconstructed luma values 2.4.3.1. Signaling of ILR Side Information The parameters are (currently) sent in the tile group header (similar to adaptive loop filtering (ALF)). These reportedly take 40-100 bits.

2.4.3.2. Usage of ILR

At the encoder side, each picture (or tile group) is firstly converted to the reshaped domain. And all the coding process is performed in the reshaped domain. For intra prediction, the neighboring block is in the reshaped domain; for inter prediction, the reference blocks (generated from the original domain from decoded picture buffer) are firstly converted to the reshaped domain. Then the residual is generated and coded to the bitstream.

After the whole picture (or tile group) finishes encoding/decoding, samples in the reshaped domain are converted to the original domain, then deblocking filter and other filters are applied.

Forward reshaping to the prediction signal is disabled for the following cases:

Current block is intra-coded

Current block is coded as current picture referencing (CPR), a.k.a. intra block copy (IBC))

Current block is coded as combined inter-intra mode (CIIP) and the forward reshaping is disabled for the intra prediction block 2.5. Virtual Pipelining Data Units (VPDU)

VPDUs are defined as non-overlapping M×M-luma (L)/N×N-chroma (C) units in a picture. In hardware decoders, successive VPDUs are processed by multiple pipeline stages at the same time; different stages process different VPDUs simultaneously. The VPDU size is roughly proportional to the buffer size in most pipeline stages, so it is said to be very important to keep the VPDU size small. In HEVC hardware decoders, the VPDU size is set to the maximum transform block (TB) size. Enlarging the maximum TB size from 32×32-L/16×16-C (as in HEVC) to 64×64-L/32×32-C (as in the current VVC) can bring coding gains, which results in 4× of VPDU size (64×64-L/32×32-C) expectedly in comparison with HEVC. However, in addition to quadtree (QT) coding unit (CU) partitioning, ternary tree (TT) and binary tree (BT) are adopted in VVC for achieving additional coding gains, and TT and BT splits can be applied to 128×128-L/64×64-C coding tree blocks (CTUs) recursively, which is said to lead to 16× of VPDU size (128×128-L/64×64-C) in comparison with HEVC.

In current design of VVC, the VPDU size is defined as 64×64-L/32×32-C.

2.6. Multiple Reference Line (MRL)

Figure 5:
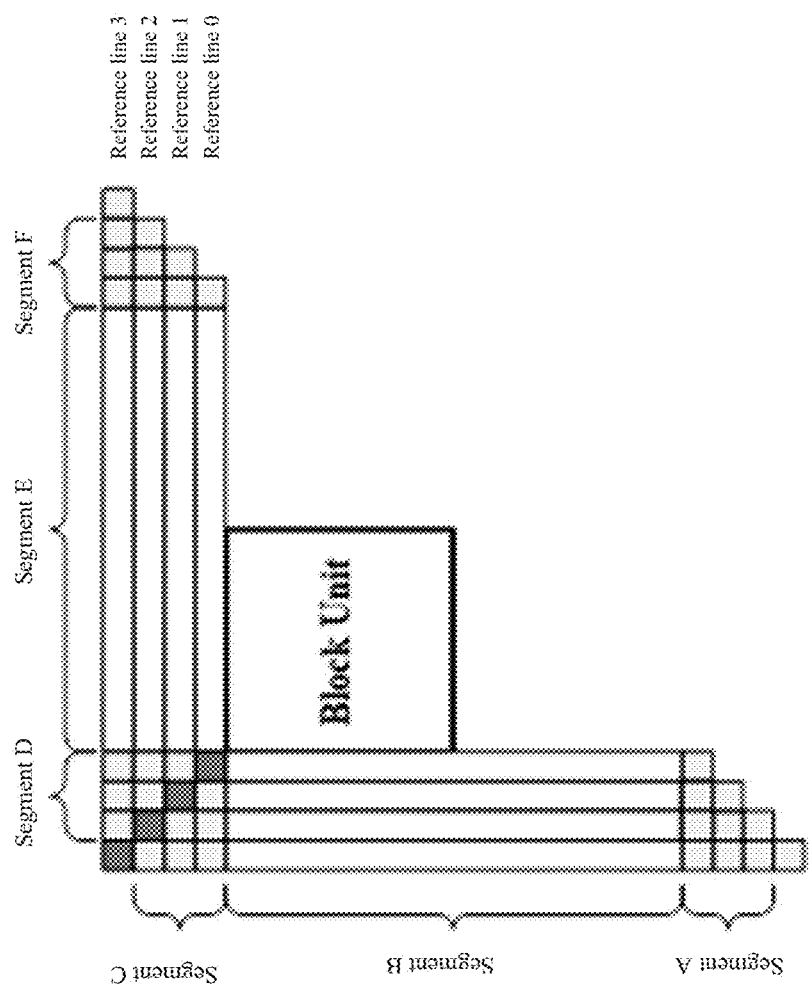
FIG. 5 is a reference line example.

MRL intra prediction uses more reference lines for intra prediction. In FIG. 5, an example of 4 reference lines is depicted, where the samples of segments A and F are not fetched from reconstructed neighboring samples but padded with the closest samples from Segment B and E, respectively. HEVC intra-picture prediction uses the nearest reference line (i.e., reference line 0). In MRL, 2 additional lines (reference line 1 and reference line 3) are used.

The index of selected reference line (mrl_idx) is signaled and used to generate intra predictor. For reference line index, which is greater than 0, only include additional reference line modes in most probable mode (MPM) list and only signal MPM index without remaining mode. The reference line index is signaled before intra prediction modes, and planar and DC modes are excluded from intra prediction modes in case a nonzero reference line index is signaled.

FIG. 5 is an example of four reference lines neighboring a prediction block.

MRL is disabled for the first line of blocks inside a CTU to prevent using extended reference samples outside the current CTU line. Also, position dependent prediction combination (PDPC) is disabled when additional line is used.

them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

Hereinafter, inner sub-partition is used to represent sub-partitions except the first sub-partition. If an ISP block is split in horizontal (vertical) direction, the first sub-partition means the above (left) sub-partition.

TABLE 2

Specification of trTypeHor and trTypeVer depending on predModeIntra

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | (nTbW >= 4 && nTbW <= 16) ? DST-VII:DCT-II | (nTbH >= 4 && nTbH <= 16) ? DST-VII: DCT-II |
| INTRA_ANGULAR33, INTRA_ANGULAR35 | DCT-II | DCT-II |
| INTRA_ANGULAR2, INTRA_ANGULAR4, . . . , INTRA_ANGULAR28, INTRA_ANGULAR30, INTRA_ANGULAR39, INTRA_ANGULAR41, . . . , INTRA_ANGULAR63, INTRA_ANGULAR65 | (nTbW >= 4 && nTbW <= 16) ? DST-VII:DCT-II | DCT-II |
| INTRA_ANGULAR3, INTRA_ANGULAR5, . . . , INTRA_ANGULAR27, INTRA_ANGULAR29, INTRA_ANGULAR38, INTRA_ANGULAR40, . . . , INTRA_ANGULAR64, INTRA_ANGULAR66 | DCT-II | (nTbH >= 4 && nTbH <= 16) ? DST-VII: DCT-II |

2.7. Intra Subblock Partitioning (ISP)

Figure 6:
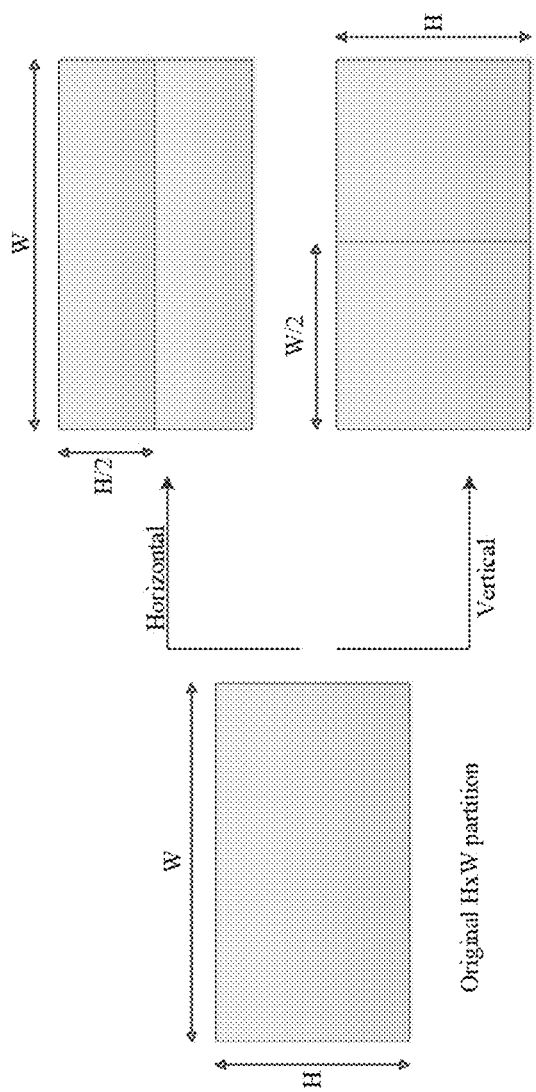
FIG. 6 shows example of division of 4×8 and 8×4 blocks.
Figure 7:
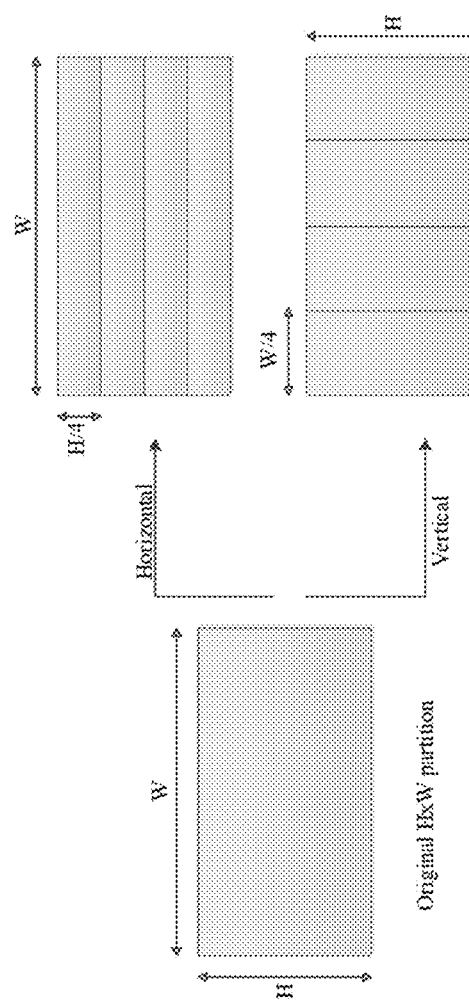
FIG. 7 shows an example of division of all blocks except 4×8, 8×4 and 4×4.
Figure 8:
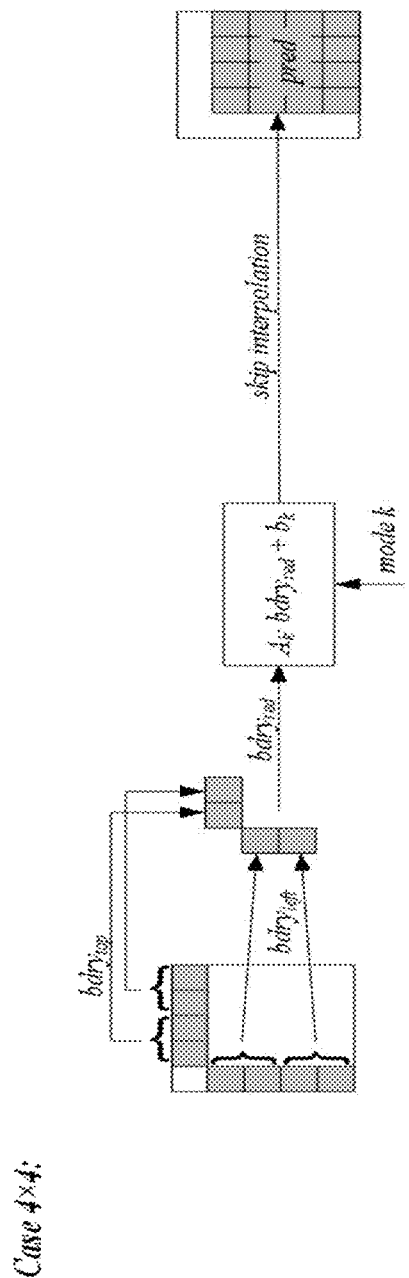
FIG. 8 is an illustration of affine linear weighted intra prediction (ALWIP) for 4×4 blocks.
Figure 9:
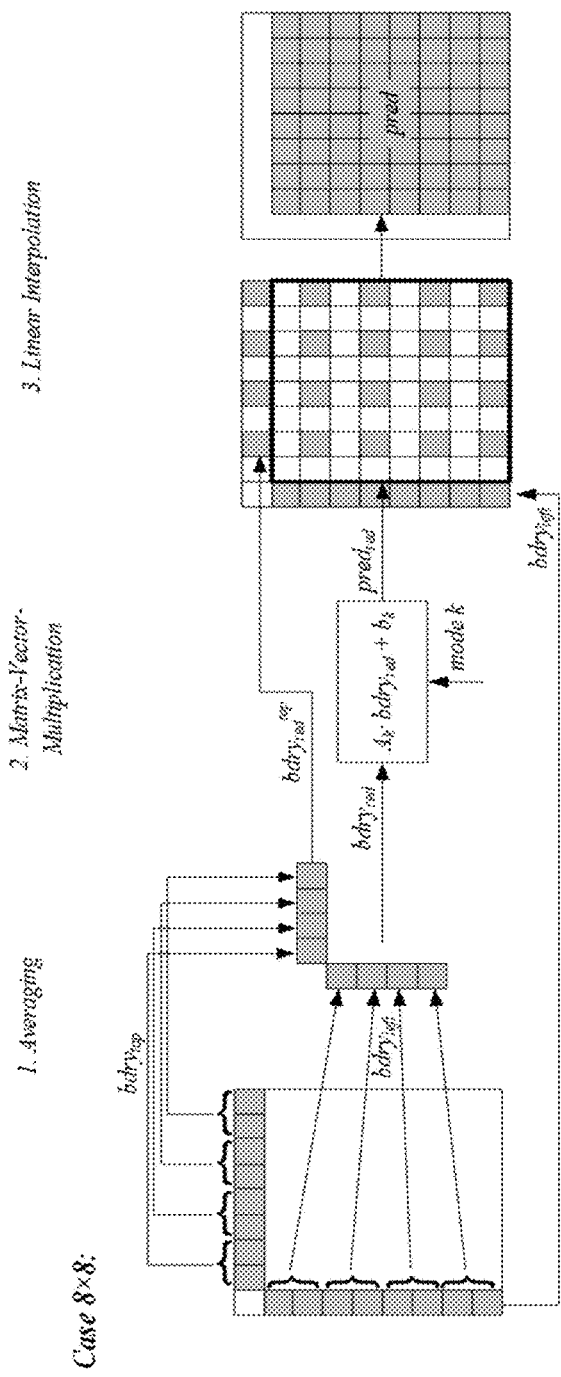
FIG. 9 is an illustration of ALWIP for 8×8 blocks.
Figure 10:
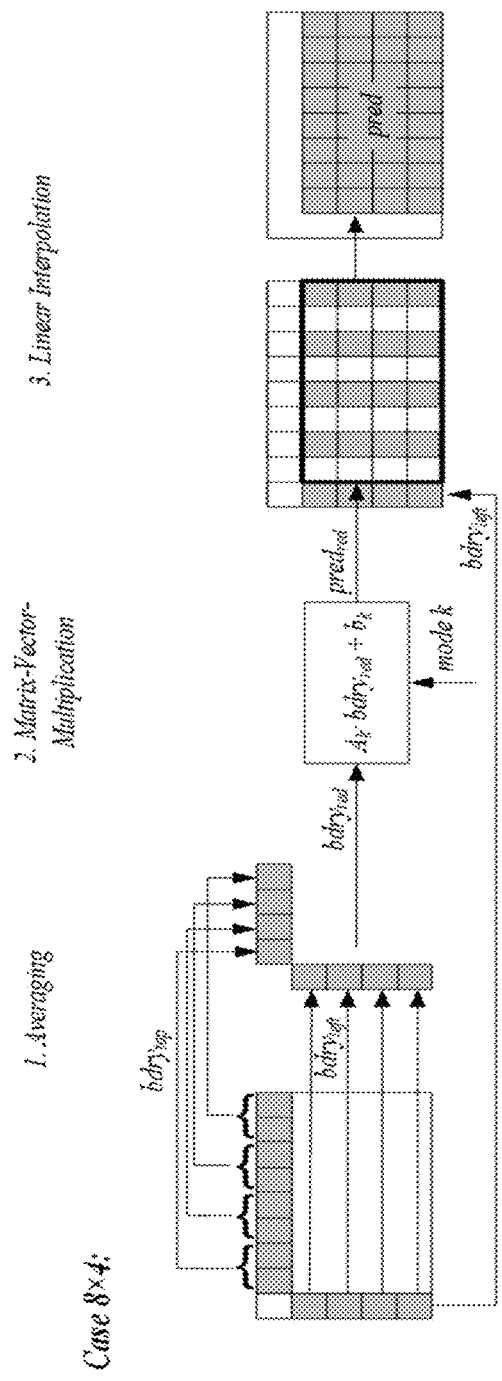
FIG. 10 is an illustration of ALWIP for 8×4 blocks.
Figure 11:
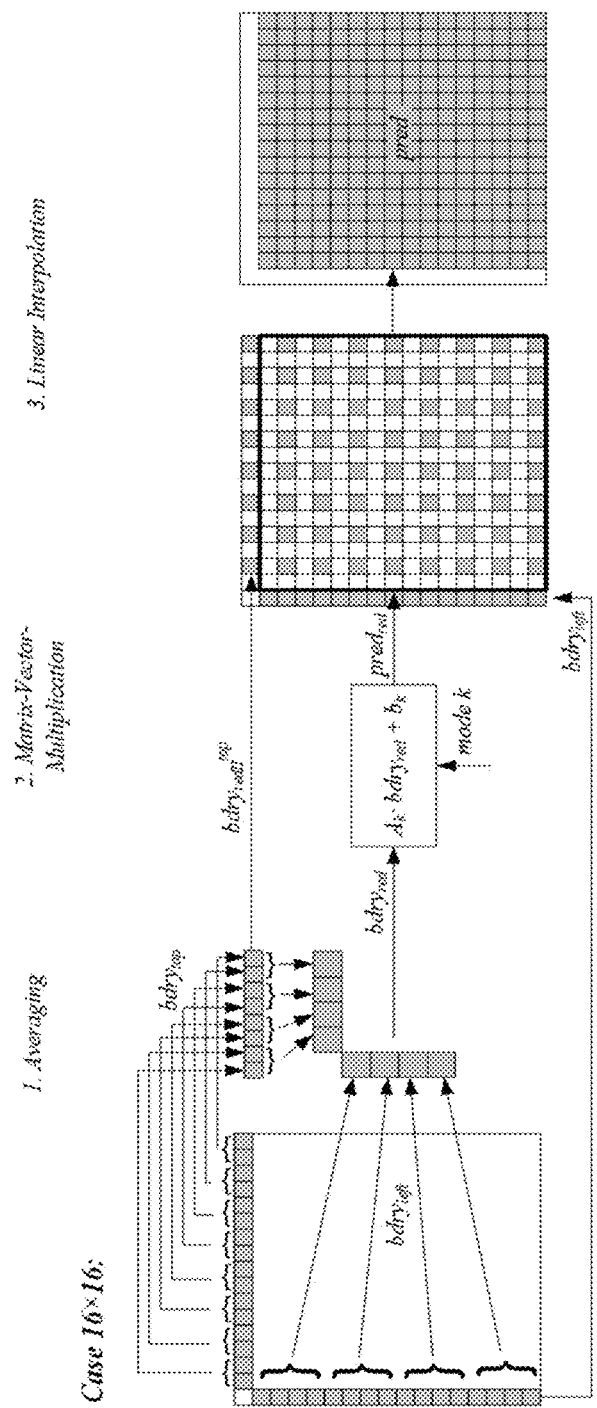
FIG. 11 is an illustration of ALWIP for 16×16 blocks.

In JVET-M0102, ISP is proposed, which divides luma intra-predicted blocks vertically or horizontally into 2 or 4 sub-partitions depending on the block size dimensions, as shown in Table 1. FIG. 6 and FIG. 7 show examples of the two possibilities. All sub-partitions fulfill the condition of having at least 16 samples. For block sizes 4×N or N×4 (with N>8), if allowed, the 1×N or N×1 sub-partition may exist.

TABLE 1

Number of sub-partitions depending on the block size (denoted maximum transform size by maxTBSize)

| Splitting direction | Block Size | Number of Sub-Partitions |
|---|---|---|
| N/A | minimum transform size | Not divided |
| 4 × 8: horizontal 8 × 4: vertical | 4 × 8 and 8 × 4 | 2 |
| Signaled | If neither 4 × 8 nor 8 × 4, and W <= maxTBSize and H <= maxTBSize | 4 |
| Horizontal | If not above cases and H > maxTBSize | 4 |
| Vertical | If not above cases and H > maxTBSize | 4 |

For each of these sub-partitions, a residual signal is generated by entropy decoding the coefficients sent by the encoder and then invert quantizing and invert transforming 2.8. Affine Linear Weighted Intra Prediction (ALWIP, a.k.a. Matrix Based Intra Prediction)

ALWIP, which is also referred to as matrix-based intra prediction (MIP) is proposed in JVET-N0217.

2.8.1. Generation of the Reduced Prediction Signal by Matrix Vector Multiplication The neighboring reference samples are firstly down-sampled via averaging to generate the reduced reference signal $bdry_{red}$. Then, the reduced prediction signal $pred_{red}$ is computed by calculating a matrix vector product and adding an offset:

$$pred_{red} = A \cdot bdry_{red} + b.$$

Here, A is a matrix that has $W_{red} \cdot H_{red}$ rows and 4 columns if W=H=4 and 8 columns in all other cases. b is a vector of size $W_{red} \cdot H_{red}$.

2.8.2. Illustration of the Entire ALWIP Process

The entire process of averaging, matrix vector multiplication and linear interpolation is illustrated for different shapes in FIG. 8, FIG. 9, FIG. 10, and FIG. 11. Note, that the remaining shapes are treated as in one of the depicted cases.

1. Given a 4×4 block, ALWIP takes two averages along each axis of the boundary. The resulting four input samples enter the matrix vector multiplication. The matrices are taken from the set $S_0$. After adding an offset, this yields the 16 final prediction samples. Linear interpolation is not necessary for generating the prediction signal. Thus, a total of (4·16)/(4·4)=4 multiplications per sample are performed.

2. Given an 8×8 block, ALWIP takes four averages along each axis of the boundary. The resulting eight input samples enter the matrix vector multiplication. The matrices are taken from the set $S_1$. This yields 16 samples on the odd positions of the prediction block. Thus, a total of (8·16)/(8·8)=2 multiplications per sample are performed. After adding an offset, these samples are interpolated vertically by using the reduced top boundary. Horizontal interpolation follows by using the original left boundary.

3. Given an 8×4 block, ALWIP takes four averages along the horizontal axis of the boundary and the four original boundary values on the left boundary. The resulting eight input samples enter the matrix vector multiplication. The matrices are taken from the set $S_1$. This yields 16 samples on the odd horizontal and each vertical positions of the prediction block. Thus, a total of (8·16)/(8·4)=4 multiplications per sample are performed. After adding an offset, these samples are interpolated horizontally by using the original left boundary.

The transposed case is treated accordingly.

4. Given a 16×16 block, ALWIP takes four averages along each axis of the boundary. The resulting eight input samples enter the matrix vector multiplication. The matrices are taken from the set $S_2$. This yields 64 samples on the odd positions of the prediction block. Thus, a total of (8·64)/(16·16)=2 multiplications per sample are performed. After adding an offset, these samples are interpolated vertically by using eight averages of the top boundary. Horizontal interpolation follows by using the original left boundary. The interpolation process, in this case, does not add any multiplications. Therefore, in total, two multiplications per sample are required to calculate ALWIP prediction.

For larger shapes, the procedure is essentially the same and it is easy to check that the number of multiplications per sample is less than four.

For W×8 blocks with W>8, only horizontal interpolation is necessary as the samples are given at the odd horizontal and each vertical position.

Finally for W×4 blocks with W>8, let $A_k$ be the matrix that arises by leaving out every row that corresponds to an odd entry along the horizontal axis of the down-sampled block. Thus, the output size is 32 and again, only horizontal interpolation remains to be performed. The transposed cases are treated accordingly.

2.8.3. Adapted MPM-List Derivation for Conventional Luma and Chroma Intra-Prediction Modes The proposed ALWIP-modes are harmonized with the MPM-based coding of the conventional intra-prediction modes as follows. The luma and chroma MPM-list derivation processes for the conventional intra-prediction modes uses fixed tables map_alwip_to_angular$_{idx}$, idx∈{0,1,2}, mapping an ALWIP-mode predmode ALWIP on a given picture unit (PU) to one of the conventional intra-prediction modes predmode$_{Angular}$=map_alwip_to_angular$_{idx(PU)}$[predmode$_{ALWIP}$].

For the luma MPM-list derivation, whenever a neighboring luma block is encountered which uses an ALWIP-mode predmode$_{ALWIP}$, this block is treated as if it was using the conventional intra-prediction mode predmode Angular. For the chroma MPM-list derivation, whenever the current luma block uses a linear weighted intra prediction (LWIP)-mode, the same mapping is used to translate the ALWIP-mode to a conventional intra prediction mode.

2.9. Quantized Residual Block Differential Pulse-Code Modulation (QR-BDPCM)

In JVET-M0413, a quantized residual block differential pulse-code modulation (QR-BDPCM) is proposed to code screen contents efficiently.

The prediction directions used in QR-BDPCM can be vertical and horizontal prediction modes. The intra prediction is done on the entire block by sample copying in prediction direction (horizontal or vertical prediction) similar to intra prediction. The residual is quantized and the delta between the quantized residual and its predictor (horizontal or vertical) quantized value is coded. This can be described by the following: For a block of size M (rows)×N (cols), let $r_{i,j}$, 0≤i≤M−1, 0≤j≤N−1 be the prediction residual after performing intra prediction horizontally (copying left neighbor pixel value across the predicted block line by line) or vertically (copying top neighbor line to each line in the predicted block) using unfiltered samples from above or left block boundary samples. Let $Q(r_{i,j})$, 0≤i≤M−1, 0≤j≤N−1 denote the quantized version of the residual $r_{i,j}$, where residual is difference between original block and the predicted block values. Then the BDPCM is applied to the quantized residual samples, resulting in modified M×N array $\tilde{R}$ with elements $\tilde{r}_{i,j}$. When vertical BDPCM is signaled:

$$\tilde{r}_{i,j} = \begin{cases} Q(r_{i,j}), & i=1, 0 \le j \le (N-1) \\ Q(r_{i,j}) - Q(r_{(i-1),j}), & 1 \le i \le (M-1), 0 \le j \le (N-1) \end{cases} \quad (2\text{-}7\text{-}1)$$

For horizontal prediction, similar rules apply, and the residual quantized samples are obtained by $$\tilde{r}_{i,j} = \begin{cases} Q(r_{i,j}), & 0 \le i \le (M-1), j=0 \\ Q(r_{i,j}) - Q(r_{i,(j-1)}), & 0 \le i \le (M-1), 1 \le j \le (N-1) \end{cases} \quad (2\text{-}7\text{-}2)$$

The residual quantized samples $\tilde{r}_{i,j}$ are sent to the decoder.

On the decoder side, the above calculations are reversed to produce $Q(r_{i,j})$, 0≤i≤M−1, 0≤j≤N−1. For vertical prediction case, $$Q(r_{i,j}) = \sum_{k=0}^{i} \tilde{r}_{k,j}, 0 \le i \le (M-1), 0 \le j \le (N-1) \quad (2\text{-}7\text{-}3)$$

For horizontal case, $$Q(r_{i,j}) = \sum_{k=0}^{j} \tilde{r}_{i,k}, 0 \le i \le (M-1), 0 \le j \le (N-1) \quad (2\text{-}7\text{-}4)$$

The inverse quantized residuals, $Q^{-1}(Q(r_{i,j}))$, are added to the intra block prediction values to produce the reconstructed sample values.

The main benefit of this scheme is that the inverse DPCM can be done on the fly during coefficient parsing simply adding the predictor as the coefficients are parsed or it can be performed after parsing.

2.10. Intra Chroma Coding

In addition to the intra chroma prediction modes, cross-component linear model (CCLM) and joint chroma residual coding are introduced in VVC.

2.10.1. Cross-Component Linear Model (CCLM)

To reduce the cross-component redundancy, a CCLM prediction mode is used in the VTM4, for which the chroma samples are predicted based on the reconstructed luma samples of the same CU by using a linear model as follows:

$$pred_C(i,j) = \alpha \cdot rec_L'(i,j) + \beta$$

where $pred_C(i, j)$ represents the predicted chroma samples in a CU and $rec_L(i, j)$ represents the downsampled reconstructed luma samples of the same CU. Linear model parameter $\alpha$ and $\beta$ are derived from the relationship between luma values and chroma values from four samples at specific positions. Among the four samples, the two larger values are averaged, and the two smaller values are averaged. The averaged values are then utilized to derive the linear model parameters.

2.10.2. Joint Chroma Residual Coding

If chrominance reshaper is active, reshaping is applied to the received residual identically to what is done in separate coding modes (that is, the joint residual signal is reshaped). On the encoder side the average of positive Cb residual and negative Cr residual are used as the joint residual when testing this mode:

$$resJoint = (resCb - resCr)/2$$

One bin indicator is signaled in the bitstream to enable the mode. In the case the mode is enabled a joint residual signal is coded in the bitstream. On the decoder side the joint residual is used for Cb component and a negative version of the residual is applied for Cr.

2.11. Sub-Block Transform (SBT) in VVC

For an inter-predicted CU with cu_cbf equal to 1, cu_sbt_flag may be signaled to indicate whether the whole residual block or a sub-part of the residual block is decoded. In the former case, inter multiple transform selection (MTS) information is further parsed to determine the transform type of the CU. In the latter case, a part of the residual block is coded with inferred adaptive transform and the other part of the residual block is zeroed out. The SBT is not applied to the combined inter-intra mode, since almost no coding gain is achieved.

2.11.1. Sub-Block TU Tiling

Figure 12:
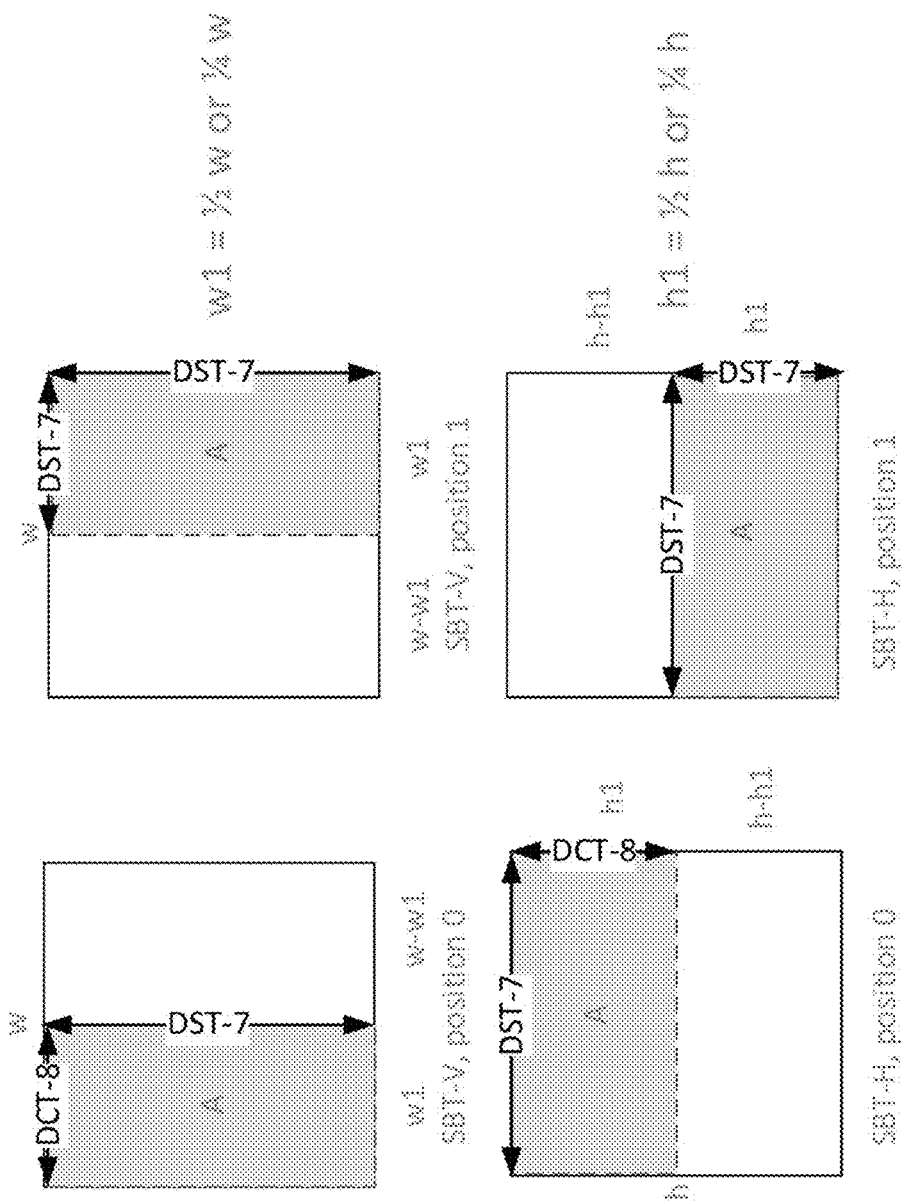
FIG. 12 is an illustration of sub-block transform (SBT) modes SBT-V and SBT-H, in which the grey area is a transform unit (TU) which may have non-zero coefficients and the white area is a zero-out TU with all zero coefficients.

When SBT is used for a inter CU, SBT type and SBT position information are further decoded from the bitstream. There are two SBT types and two SBT positions, as indicated in FIG. 12. For SBT-V (or SBT-H), the TU width (or height) may equal to half of the CU width (or height) or ¼ of the CU width (or height), signaled by another flag, resulting in 2:2 split or 1:3/3:1 split. The 2:2 split is like a binary tree (BT) split while the 1:3/3:1 split is like an asymmetric binary tree (ABT) split. If one side of CU is 8 in luma samples, the 1:3/3:1 split along this side is not allowed. Hence, there are at most 8 SBT modes for a CU.

Figure 13:
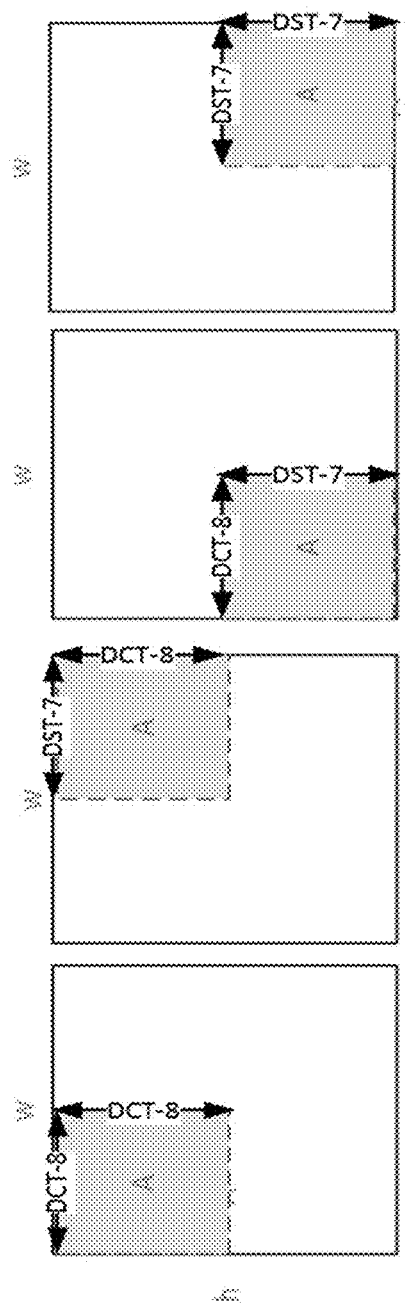
FIG. 13 is an illustration of sub-block transform modes SBT-Q.

Quad-tree (QT) split is further used to tile one CU into 4 sub-blocks, and still one sub-block has residual, as shown in FIG. 13. This SBT type is denoted as SBT-Q. This part was not adopted by VVC.

SBT-V, SBT-H and SBT-Q are allowed for CU with width and height both no larger than maxSbtSize. The maxSbtSize is signaled in SPS. For HD and 4K sequences, maxSbtSize is set as 64 by encoder; for other smaller resolution sequences, maxSbtSize is set as 32.

2.11.2. Transform Type of the Sub-Block

Position-dependent transform is applied on luma transform blocks in SBT-V and SBT-H (chroma TB always using DCT-2). The two positions of SBT-H and SBT-V are associated with different core transforms. More specifically, the horizontal and vertical transforms for each SBT position is specified in FIG. 12. For example, the horizontal and vertical transforms for SBT-V position 0 is DCT-8 and DST-7, respectively. When one side of the residual TU is greater than 32, the corresponding transform is set as DCT-2. Therefore, the sub-block transform jointly specifies the TU tiling, cbf, and horizontal and vertical transforms of a residual block, which may be considered a syntax shortcut for the cases that the major residual of a block is at one side of the block.

FIG. 12 is an illustration of sub-block transform modes SBT-V and SBT-H (The grey area is a TU which may have non-zero coefficients; the white area is a zero-out TU with all zero coefficients).

FIG. 13 is an illustration of sub-block transform modes SBT-Q.

2.12. Partition Tree

In VTM5, the coding tree scheme supports the ability for the luma and chroma to have a separate block tree structure. Currently, for P and B slices, the luma and chroma coding tree blocks (CTBs) in one CTU have to share the same coding tree structure. However, for I slices, the luma and chroma can have separate block tree structures. When separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three color components unless the video is monochrome.

3. Examples of Technical Problems Addressed by the Solutions Described in this Disclosure How to apply ACT to the VVC design needs to be studied, and, in particular the interaction between ACT and other tools needs to be resolved:

1. ILR is to convert the luma component from a whole picture/slice/tile from the original domain to reshaped domain and code everything in the reshaped domain. However, for the chroma component, it is coded in the original domain. ACT requires to get the residual signal of pixels for three-color components.
2. How to handle ACT when dual tree is enabled.
3. The current ACT design in VVC7 does not support lossless coding.
4. QP adjustment for ACT does not consider QP offset in the original color space.

4. Examples of Solutions and Embodiments

The listing below should be considered as examples to explain general concepts. These inventions should not be interpreted in a narrow way. Furthermore, these embodiments can be combined in any manner.

In the following discussion, a CU may comprise information associated to all the three-color components with the single tree coding structure. Or a CU may comprise information only associated to the luma color component with the mono-color coding. Or a CU may comprise information only associated to the luma color component (e.g., Y component in YCbCr format or G component in GBR format) with the dual tree coding structure. Or a CU may comprise information only associated to the two chroma components (e.g., Cb and Cr components in YCbCr format or B and R components in GBR format) with the dual-tree coding structure.

In the following description, a "block" may refer to coding unit (CU) or a transform unit (TU) or any rectangle or polygonal region of video data. a "current block" may refer to a current being decoded/coded coding unit (CU) or a current being decoded/coded transform unit (TU) or any being decoded/coded coding rectangle region of video data. "CU" or "TU" may be also known as "coding block" and "transform block".

In the following discussions, the term 'ACT' may represent any technology that may convert the original signals/prediction signals/reconstructed signals/residual signals of three-color components from one domain to another domain, not necessarily to be the same design in HEVC SCC.

1. ACT is disabled for all blocks in a video unit when dual tree partitioning structure is enabled for the video unit (e.g., slice/tile/brick/picture/a region covering one or multiple CTUs).
    a. Indications of usage of ACT may be conditionally signaled based on the usage of the dual-tree partitioning structure.
        i. In one example, when the dual-tree partitioning structure is applied, the signaling of indications of usage of ACT may be skipped.
2. ACT is disabled for all blocks in a video unit when ILR is enabled for the video unit (e.g., slice/tile/brick/picture/a region covering one or multiple CTUs).
    a. Indications of usage of ACT may be conditionally signaled based on the usage of ILR.
        i. In one example, when ILR is applied, the signaling of indications of usage of ACT may be skipped.
3. ACT and a coding tool X are exclusively applied for a video block (e.g., CU/TU).
    a. In one example, X is CCLM. If CCLM is enabled for chroma components of the video block, ACT is disabled; and/or vice versa.
    b. In one example, X is joint chroma residual coding. If joint chroma residual coding is enabled for chroma components of the video block, ACT is disabled; and/or vice versa.
    c. In one example, X is matrix based intra prediction method. If the matrix based intra prediction method is enabled for the luma component of the video block, ACT is disabled; and/or vice versa.
    d. In one example, X is QR-BDPCM. If QR-BDPCM is enabled for the luma components of the video block, ACT is disabled; and/or vice versa.
    e. In one example, X is sub-block transform (SBT). If SBT is enabled for the luma components of the video block, ACT is disabled; and/or vice versa.
    f. In one example, X is multiple transform selection (MTS). If MTS is enabled for the luma components of the video block, ACT is disabled; and/or vice versa.
    g. In one example, X is Low frequency non-separable transform (LFNST). If LFNST is enabled, ACT is disabled; and/or vice versa.
    h. In one example, X is Pulse Code Modulation (PCM). If PCM is enabled, ACT is disabled; and/or vice versa.
    i. In one example, X is Transform Skip (TS). If TS is enabled, ACT is disabled; and/or vice versa.
    j. In one example, X is Intra Subblock Partitioning (ISP). If ISP is enabled, ACT is disabled; and/or vice versa.
    k. Alternatively, furthermore, indications of usage of ACT may be conditionally signaled based on the usage of the coding tool X.
        i. In one example, when the coding tool X is enabled, the signaling of indications of usage of ACT may be skipped.
    l. Alternatively, furthermore, indications of usage of tool X may be conditionally signaled based on the usage of ACT.
        i. In one example, when ACT is enabled, the signaling of indications of usage of the coding tool X may be skipped.
    m. Alternatively, the above mentioned tools and ACT may be both enabled for one video block.
4. ACT and dual tree partition structure may be both enabled for one video unit (e.g., picture/slice/tile/brick).
    a. Alternatively, furthermore, the signaling of usage of dual tree partition structure is moved from video unit-level to video block (e.g., CTU/CTB or VPDU)-level.
    b. ACT and dual tree partition structure may be both enabled for one video block.
        i. In one example, at the encoder side, ACT may be firstly applied to a CTU/CTB before partitioning of the CTU/CTB.
        ii. In one example, at the decoder side, a CTU/CTB may be first decoded, followed by inverse color-space transform.
5. ACT and ILR may be both enabled for one video unit (e.g., picture/slice/tile/brick).
    a. Alternatively, furthermore, the signaling of usage of ILR is moved from video unit-level to video block (e.g., CU/TU)-level.
    b. ACT and ILR may be both enabled for one video block (e.g., CU/TU).
        i. In one example, at the encoder side, ACT may be firstly applied, followed by ILR. That is, the prediction signal and residual signal is firstly generated in the original domain, ACT is applied to convert the residual signal from the original domain to a different color-space domain; and ILR is further applied to convert the residual signal to the reshaped domain.
        ii. In one example, at the decoder side, ILR may be firstly applied, followed by inverse color-space transform. That is, ILR is firstly applied to convert the decoded residual signal from the reshaped domain to the color-space domain; then ACT is applied to convert from the color-space domain to the original domain.
6. ACT and SBT may be both enabled for one video block (e.g., CU/TU).
    a. In one example, the predictor error in a converted color-space domain (e.g., original domain is RGB, converted domain is YCoCg with ACT) is coded with two TUs. One of them is all zero coefficients and the other one has non-zero coefficients.
        i. Alternatively, furthermore, the one TU that has non-zero coefficients may be obtained via transforms or transform skip.
        ii. In one example, how to split it to 2 TUs; and/or what kinds of transforms may be applied to one of the two TUs may be signaled, e.g., in a similar way as SBT.
7. For a video unit (e.g., slice/tile/brick/picture), ACT may be enabled in different levels, such as CU-level and TU-level.

a. In one example, the signaling of usage of ACT may be in different levels, such as CU-level and TU-level, for different video blocks in the video unit.
b. Whether to enable/signal the ACT in CU or TU level and/or whether to signal the usage of ACT may be determined based on coding characteristics.
  i. In one example, whether to enable/signal the ACT in CU or TU level may be determined based on the dimensions of the current CU. Suppose the width and height of the current CU are denoted as W and H, respectively.
    1. For example, whether to enable/signal the ACT in CU or TU level may be determined based on whether the current CU has a size greater than the VPDU size.
      a. In one example, if current CU has a size greater than the VPDU size, CU-level signaling/usage of ACT may be applied (i.e., all TUs share the same on/off control of ACT). Otherwise, TU-level signaling/usage of ACT may be applied.
      b. Alternatively, if current CU has a size greater than the VPDU size, TU-level signaling/usage of ACT may be applied (i.e., all TUs share the same on/off control of ACT). Otherwise, CU-level signaling/usage of ACT may be applied.
      c. In one example, if current CU has a size greater than the VPDU size, ACT is disabled without being signaled.
    2. In one example, whether to enable/signal the ACT in CU or TU level may be determined based on the current CU has a size greater than the maximum TU size.
    3. In one example, ACT is disabled when W>=T1 and H>=T2. E.g., T1=T2=32.
      a. Alternatively, ACT is disabled when W>=T1 or H>=T2. E.g., T1=T2=32.
      b. Alternatively, ACT is disabled when W<=T1 and H<=T2. E.g., T1=T2=8.
      c. Alternatively, ACT is disabled when W<=T1 or H<=T2. E.g., T1=T2=8.
      d. Alternatively, ACT is disabled when W*H>=T. E.g., T=1024.
      e. Alternatively, ACT is disabled when W*H<=T. E.g., T=64.
  ii. In one example, whether to enable/signal the ACT in CU or TU level may be determined based on the current CU is coded with sub-block partition tools, such as ISP.

In the following discussion, whether a specific color space (such as YCoCg-R) is applied may be determined by ACT at sequence/picture/slice/tile/block level.

8. The QP adjustments (which may be a difference between QPs of different color components) for a color channel (e.g., Y, Cg, Co) may be a constant for a ACT coded block.
  a. In one example, for YCoCg color space, the QP adjustment for Y and Cg channels may be equal to a given value, K1.
    i. In one example, K1 may be −5.
    ii. Alternatively, the QP adjustment for Co channel may be equal to another value, K2.
      1. In one example, K2 may be −1.
  b. In one example, for YCoCg color space, the QP adjustments for Y may be K1 and the QP adjustment for Cg may be (K1+O).
    i. In one example, K1 may be −5.
    ii. In one example, O may be 6.
  c. In one example, for YCoCg-R color space, the QP adjustments for Y may be K1 and the QP adjustment for Cg may be (K1+O).
    i. In one example, K1 may be −5.
    ii. In one example, O may be 6.
  d. In one example, for YCoCg-R color space, the QP adjustments for Y and/or Cg channels may be K1 and the QP adjustment for Co may be (K1+O).
    i. In one example, K1 may be −5.
    ii. Alternatively, the QP adjustment for Co channel may be equal to another value, K2.
      1. In one example, K2 may be −1.
  e. In one example, K1/O/K2 may be pre-defined.
  f. In one example, K1/O/K2 may be indicated in a video unit (e.g., sequence/picture/slice/tile/brick/subpicture) level, such as in video parameter set (VPS) and/or dependency parameter set (DPS) and/or sequence parameter set (SPS) and/or picture parameter set (PPS) and/or picture header and/or slice header.
    i. At least two of K1, K2 and O may be jointly coded or predictively coded.
9. QP adjustments for Y, Co and Cg color channels may be indicated by high-level syntax elements.
  a. In one example, QP adjustment for Y channel, QP adjustment for Co channel and QP adjustment for Cg channel may be indicated independently by high-level syntax elements.
  b. In one example, QP adjustment for Y channel, QP adjustment for Co channel and QP adjustment for Cg channel may be indicated in a video unit (e.g., sequence/picture/slice/tile/brick/subpicture) level, such as in VPS and/or DPS and/or SPS and/or PPS and/or picture header and/or slice header.
10. Deblocking process may depend on color space.
  a. In one example, deblocking for one color space may follow deblocking for 4:2:0 color format and deblocking for the other color space may follow deblocking for luma component.
    i. In one example, deblocking for YCoCg/YCoCg-R color space may follow the current deblocking for 4:2:0 color format.
    ii. In one example, deblocking for all components in GBR/RGB color space may follow the current deblocking for luma component.
  b. Whether and/or how to apply deblocking process may depend on whether ACT is applied.
11. YCoCg-R transform may be always applied when ACT is enabled for a block.
  a. In one example, when YCoCg-R is applied, QP adjustments may be (−5, 3, 1) for (Y, Co, Cg) color channels.
  b. In one example, when YCoCg-R is applied, the lowest allowed QP for transform skip blocks may be the same.
    i. In one example, the lowest allowed QP for transform skip blocks may be QpPrimeTsMin.
12. The lowest allowed QP for transform skip blocks may be independent of whether ACT is applied or not.
  a. In one example, the QP adjustment for ACT coded blocks may be added firstly before being clipped to a given range, such as max (QpPrimeTsMin, derived QP with QP adjustment taken into consideration).
  b. In one example, the lowest QP for transform skip blocks may be always QpPrimeTsMin.

13. The lowest allowed QP for transform skip blocks may depend on color channels when ACT is applied.
    a. In one example, different color channels may have different lowest allowed QP for transform skip blocks.
    b. In one example, Y and Cg channels may have the same lowest allowed QP for transform skip blocks.
        i. Alternatively, Co channel may have another lowest allowed QP for transform skip blocks.
14. The above methods may also be applied to other color spaces, not just limited to YCoCg or YCoCg-R color space.
15. It is proposed to enable JCCR and tool X exclusively.
    a. The tool X may be the transform skip mode (e.g., transform_skip_flag of a block is equal to 1).
    b. The tool X may be the Block-based Delta Pulse Code Modulation (BDPCM) mode (e.g., intra_bdpcm_luma_flag of a block is equal to 1).
    c. The tool X may be ACT.
    d. When tool X is enabled, indication of usage of JCCR is omitted in the bitstream, and inferred to be disabled, or vice versa.
16. Whether to enable a coding X and/or whether to signal indications of usage and/or side information of the X may depend on the quantization parameter associated with a video unit (e.g., a slice/picture/subpicture/tile/brick/block).
    a. In one example, if the quantization parameter is greater than (or no smaller than) a threshold, the coding tool X may be disabled.
    b. In one example, if the quantization parameter is smaller than (or no greater than) a threshold, the coding tool X may be disabled.
    c. When a coding tool X is disabled, the signaling of indications of usage and/or side information of the X may be omitted.
    d. In one example, the coding tool X may be JCCR, LMCS, ACT.

5. Other Embodiments 5.1. Embodiment #1

The following changes to demonstrate the lowest QP for transform skip blocks when ACT is used, marked in bold and Italic, are based on JVET-P2001-vB.docx. Deleted texts are marked with double brackets (e.g., [[a]] denotes the deletion of the character "a").

8.7.3 Scaling Process for Transform Coefficients

Inputs to this process are:
    a luma location (xTbY, yTbY) specifying the top-left sample of the current luma transform block relative to the top-left luma sample of the current picture.
    a variable nTbW specifying the transform block width,
    a variable nTbH specifying the transform block height.
    a variable predMode specifying the prediction mode of the coding unit.
    a variable cIdx specifying the colour component of the current block.

Output of this process is the (nTbW) x (nTbH) array d of scaled transform coefficients with elements d[x][y].

The quantization parameter qP is derived as follows:
If cIdx is equal to 0, the following applies:

$$qP = Qp'_Y \qquad (8\text{-}936)$$

Otherwise, if TuCResMode [xTbY][yTbY] is equal to 2, the following applies:

$$qP = Qp'_{CbCr} \qquad (8\text{-}937)$$

Otherwise, if cIdx is equal to 1, the following applies:

$$qP = Qp'_{Cb} \qquad (8\text{-}938)$$

Otherwise (cIdx is equal to 2), the following applies:

$$qP = Qp'_{Cr} \qquad (8\text{-}939)$$

The quantization parameter qP is modified and the variables rectNonTsFlag, and bdShift are derived as follows:
If transform_skip_flag[xTbY][yTbY][cIdx] is equal to 0, the following applies:

$$qP = qP - (cu\_act\_enabled\_flag[xTbY][yTbY]?5:0) \qquad (8\text{-}940)$$

$$rectNonTsFlag = (((\text{Log } 2(nTbW) + \text{Log } 2(nTbH))\&1) == 1 \qquad (8\text{-}941)$$

$$bdShift = BitDepth + (rectNonTsFlag?1:0) + \qquad (8\text{-}942)$$

$$((\text{Log } 2(nTbW) + \text{Log } 2(nTbH))/2) - 5 + pic\_dep\_quant\_enabled\_flag$$

Otherwise, if transform_skip_flag[xTbY][yTbY][cIdx] is equal to 1, the following applies:

$$[[qP = \text{Max}(OpPrimeTsMin, qP) - (cu\_act\_enabled\_flag[xTbY][yTbY]?5:0) \qquad (8\text{-}943)]]$$

If cIdx is equal to 0

$$qP = \text{Max}(\text{Max}(4, QpPrimeTsMin-12), qP - (cu\_act\_enabled\_flag[xTbY][yTbY]?5:0))$$

otherwise, if cIdx is equal to 1

$$qP = \text{Max}(\text{Max}(4, QpPrimeTsMin-12), qP - (cu\_act\_enabled\_flag[xTbY][yTbY]?5:0))$$

otherwise, if cIdx is equal to 2

$$qP = \text{Max}(\text{Max}(4, OpPrimeTsMin-6), qP - (cu\_act\_enabled\_flag[xTbY][yTbY]?3:0))$$

$$rectNonTsFlag = 0 \qquad (8\text{-}944)$$

$$bdShift = 10 \qquad (8\text{-}945)$$

The variable bdOffset is derived as follows:

$$bdOffset = (1 << bdShift) >> 1 \qquad (8\text{-}946)$$

Figure 14A:
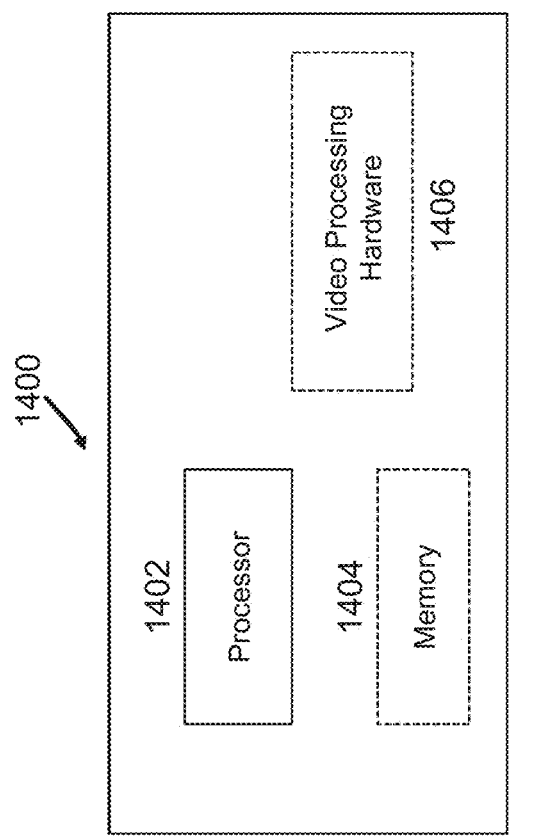
FIGS. 14A and 14B are block diagrams of example apparatuses for video processing.

FIG. 14A is a block diagram of a video processing apparatus 1400. The apparatus 1400 may be used to implement one or more of the methods described herein. The apparatus 1400 may be embodied in a smartphone, tablet, computer, Internet of Things (IoT) receiver, and so on. The apparatus 1400 may include one or more processors 1402, one or more memories 1404 and video processing hardware 1406. The processor(s) 1402 may be configured to implement one or more methods described in the present disclosure. The memory (memories) 1404 may be used for storing data and code used for implementing the methods and embodiments described herein. The video processing hardware 1406 may be used to implement, in hardware circuitry, some embodiments described in the present disclosure.

Figure 14B:
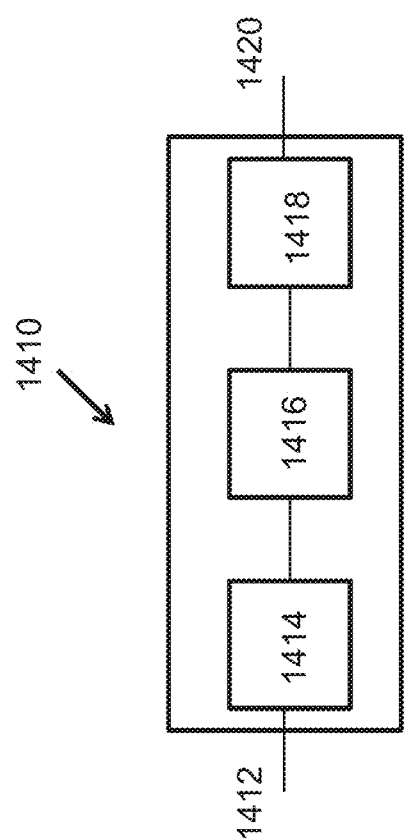

FIG. 14B is another example of a block diagram of a video processing system in which disclosed embodiments may be implemented. FIG. 14B is a block diagram showing an example video processing system 1410 in which various embodiments disclosed herein may be implemented. Various implementations may include some or all of the components of the system 1410. The system 1410 may include input 1412 for receiving video content. The video content may be received in a raw or uncompressed format, e.g., 8- or 10-bit multi-component pixel values, or may be in a compressed or encoded format. The input 1412 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1410 may include a coding component 1414 that may implement the various coding or encoding methods described in the present disclosure. The coding component 1414 may reduce the average bitrate of video from the input 1412 to the output of the coding component 1414 to produce a coded representation of the video. The coding techniques are therefore sometimes called video compression or video transcoding techniques. The output of the coding component 1414 may be either stored, or transmitted via a communication connected, as represented by the component 1416. The stored or communicated bitstream (or coded) representation of the video received at the input 1412 may be used by the component 1418 for generating pixel values or displayable video that is sent to a display interface 1420. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or DisplayPort, and so on. Examples of storage interfaces include serial advanced technology attachment (SATA), peripheral component interface (PCI), integrated drive electronics (IDE) interface, and the like. The embodiments described in the present disclosure may be embodied in various electronic devices such as mobile phones, laptops, smartphones or other devices that are capable of performing digital data processing and/or video display.

In some embodiments, the video coding methods may be implemented using an apparatus that is implemented on a hardware platform as described with respect to FIG. 14A or 14B.

Some embodiments of the present disclosure include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The disclosed and other solutions, examples, embodiments, modules and the functional operations described in this disclosure can be implemented in digital electronic circuitry, or in computer software, firmware, or hardware, including the structures disclosed in this disclosure and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., a field-programmable gate array (FPGA) or an application-specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electronically erasable programmable read-only memory (EEPROM), and flash memory devices; magnetic disks, e.g., internal hard disks or removable disks; magneto optical disks; and compact disc, read-only memory (CD-ROM) and digital versatile disc, read-only memory (DVD-ROM) disks. The processor and the memory can be supplemented by, or incorporated in, special purpose logic circuitry.

Figure 15:
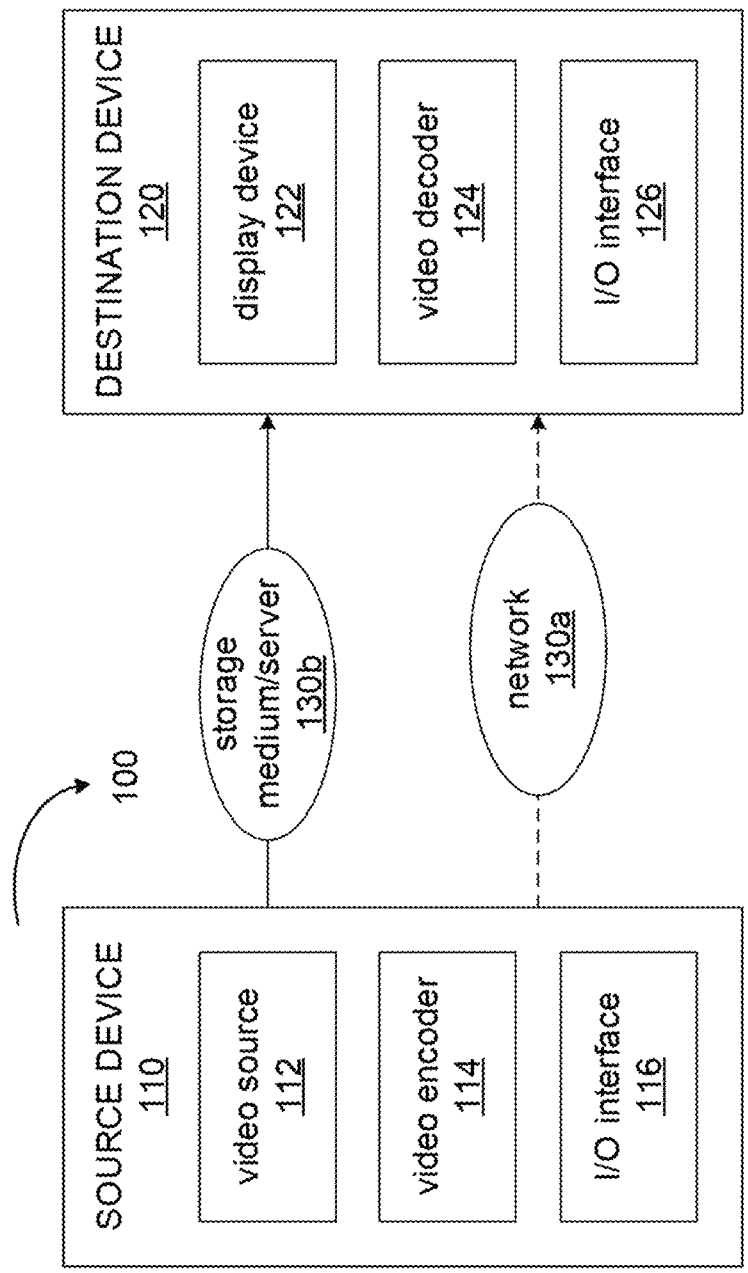
FIG. 15 is a block diagram that illustrates an example video coding system.

FIG. 15 is a block diagram that illustrates an example video coding system 100 that may utilize the embodiments of this disclosure.

As shown in FIG. 15, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 16:
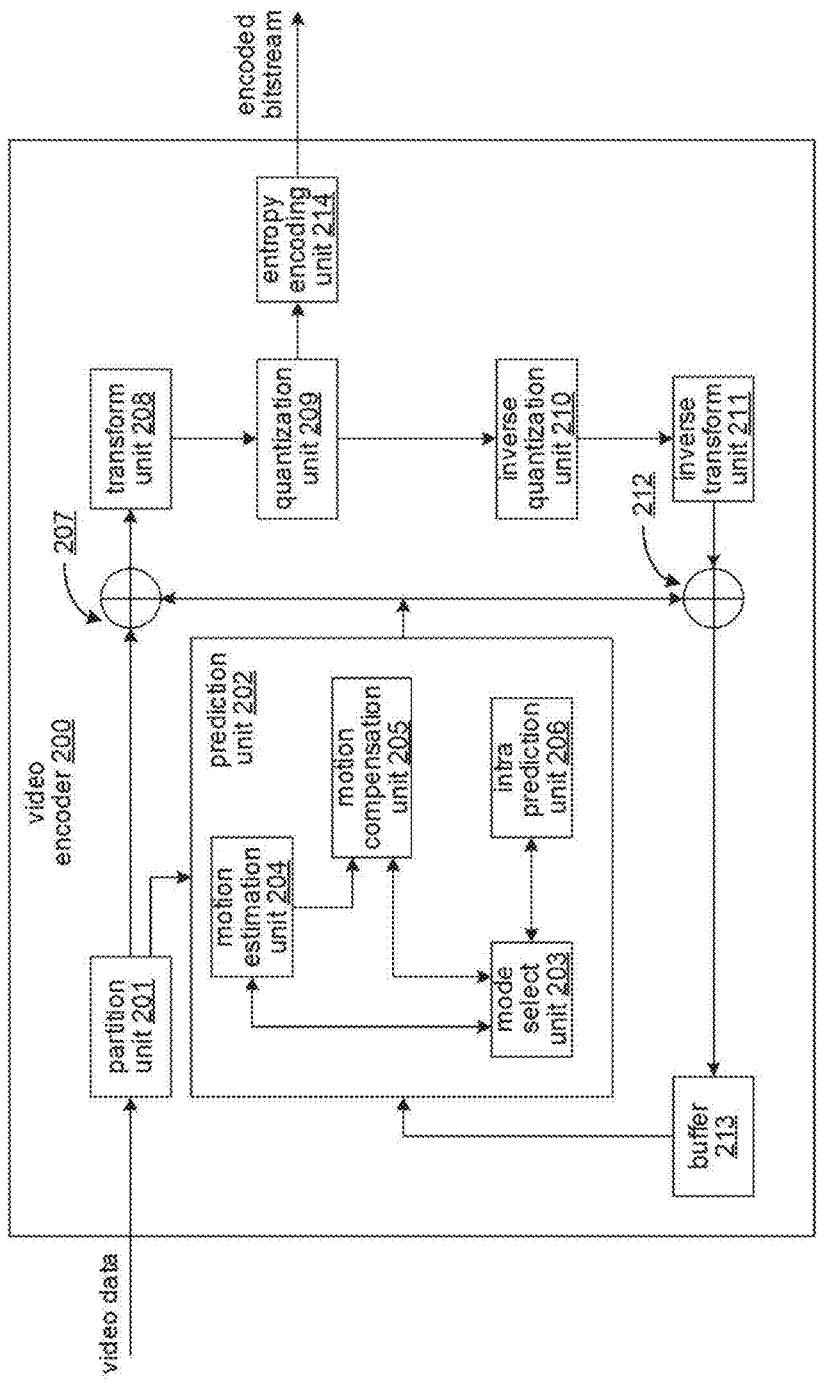
FIG. 16 is a block diagram that illustrates an encoder in accordance with some embodiments of the present disclosure.

FIG. 16 is a block diagram illustrating an example of video encoder 200, which may be video encoder 114 in the system 100 illustrated in FIG. 15.

Video encoder 200 may be configured to perform any or all of the embodiments of this disclosure. In the example of FIG. 16, video encoder 200 includes a plurality of functional components. The embodiments described in this disclosure may be shared among the various components of video encoder 200. In some examples, a processor may be configured to perform any or all of the embodiments described in this disclosure.

The functional components of video encoder 200 may include a partition unit 201, a prediction unit 202 which may include a mode select unit 203, a motion estimation unit 204, a motion compensation unit 205, and an intra prediction unit 206; a residual generation unit 207; a transform unit 208; a quantization unit 209; an inverse quantization unit 210; an inverse transform unit 211; a reconstruction unit 212; a buffer 213; and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 16 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 17:
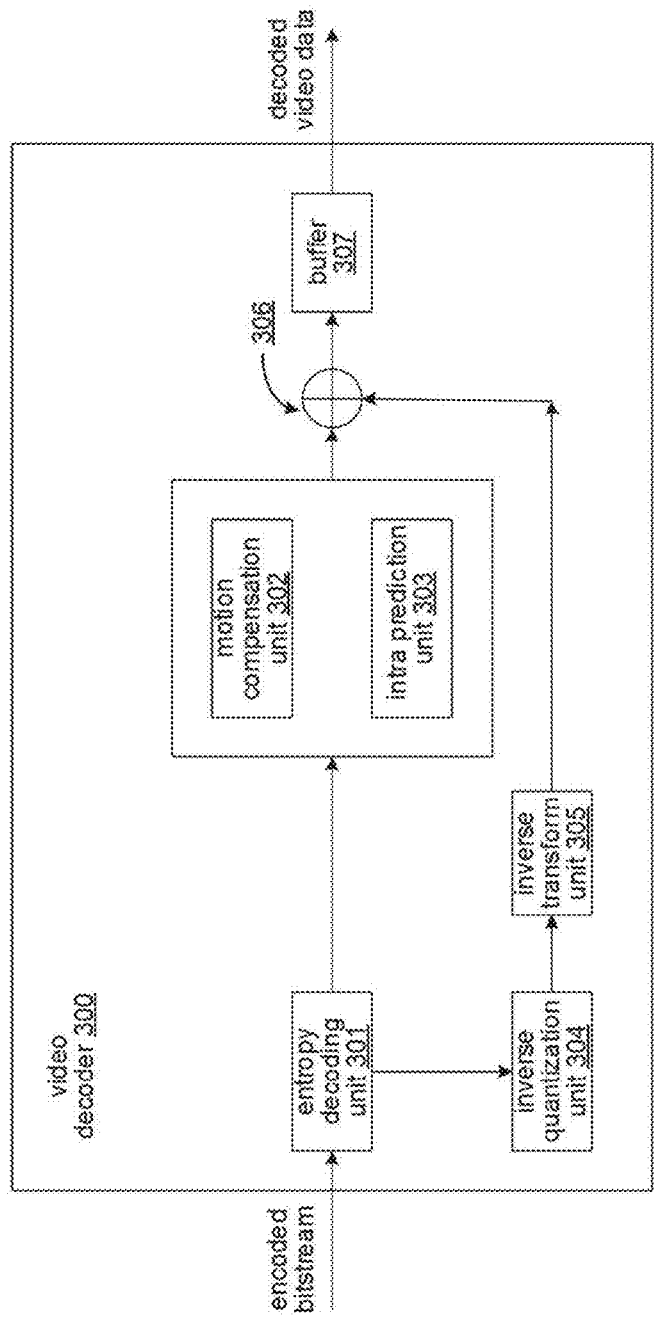
FIG. 17 is a block diagram that illustrates a decoder in accordance with some embodiments of the present disclosure.

FIG. 17 is a block diagram illustrating an example of video decoder 300 which may be video decoder 124 in the system 100 illustrated in FIG. 15.

The video decoder 300 may be configured to perform any or all of the embodiments of this disclosure. In the example of FIG. 17, the video decoder 300 includes a plurality of functional components. The embodiments described in this disclosure may be shared among the various components of the video decoder 300. In some examples, a processor may be configured to perform any or all of the embodiments described in this disclosure.

In the example of FIG. 17, video decoder 300 includes an entropy decoding unit 301, a motion compensation unit 302, an intra prediction unit 303, an inverse quantization unit 304, an inverse transformation unit 305, a reconstruction unit 306, and a buffer 307. Video decoder 300 may, in some examples, perform a decoding pass generally reciprocal to the encoding pass described with respect to video encoder 200 (e.g., FIG. 16).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

Various solutions and embodiments described in the present disclosure are further described using a list of clauses. The first set of clauses show example embodiments discussed in the previous sections.

Item 1 in the previous section provides additional examples of the following clauses.

1. A method of video processing, comprising: determining that due to a dual tree partitioning structure being used for a conversion between a video unit and a bitstream representation of the video unit, that use of adaptive color space transformation (ACT) is disabled for the video unit; and performing, based on the determining, the conversion by disabling the ACT for the vide unit.

2. The method of clause 1, wherein the bitstream representation excludes bits for providing information about usage of the ACT.

Item 2 in the previous section provides additional examples of the following clauses.

1. A method of video processing, comprising: determining, due to an in-loop reshaper being enabled for use for a conversion between a video unit and a bitstream representation of the video unit, to disable an adaptive color space transformation (ACT) for the conversion; and performing, based on the determining, the conversion by disabling the ACT for the video unit.

2. The method of clause 1, wherein the bitstream representation includes bits for providing information about usage of the ILR.

Item 3 in the previous section provides additional examples of the following clauses.

3. A method of video processing. comprising: determining, due to a coding tool being used for a conversion between a video unit and a bitstream representation of the video unit, that an adaptive color space transformation tool is disabled for the conversion; and performing, based on the determining, the conversion by disabling the ACT for the video unit.

4. The method of clause 3, wherein the coding tool corresponds to a cross-component linear model tool.

5. The method of clause 3, wherein the coding tool corresponds to a joint chroma residual coding.

6. The method of clause 3, wherein the coding tool corresponds to a multiple transform selection (MTS) coding tool.

Item 4 in the previous section provides additional examples of the following clauses.

7. A method of video processing, comprising: determining that both a dual tree partitioning structure and an adaptive color space transformation (ACT) coding tool are used for a conversion between a video unit and a bitstream representation of the video unit; and performing, based on the determining, the conversion by enabling the ACT for the video unit.

8. The method of clause 7, wherein the bitstream representation includes signaling of the dual partition tree structure at a video block level that is a finer level than the video unit level.

Item 5 in the previous section provides additional examples of the following clauses.

9. A method of video processing, comprising: determining that both an in-loop reshaping (ILR) and an adaptive color space transformation (ACT) coding tool are used for a conversion between a video unit and a bitstream representation of the video unit; and performing, based on the determining, the conversion using the ILR and the ACT coding tool.

10. The method of clause 9, wherein the performing the conversion includes, during encoding, first applying the ACT coding tool and next applying the ILR on a result of the applying the ACT.

11. The method of clause 9, wherein the performing the conversion includes, first applying the ILR and then an inverse color space transform is applied to a result of the ILR.

Item 6 in the previous section provides additional examples of the following clauses.

12. A method of video processing, comprising: determining that both a sub-block transform (SBT) and an adaptive color space transformation (ACT) coding tool are used for a conversion between a video unit and a bitstream representation of the video unit; and performing, based on the determining, the conversion using the SBT and the ACT coding tool.

13. The method of clause 12, wherein a prediction error during the conversion is transformed from an RGB color space to a YCoCg color space.

14. The method of clause 13, wherein the prediction error, after the transforming, is coded using at least two transform unit (TU) partitions.

Item 7 in the previous section provides additional examples of the following clauses.

15. The method of any of above clauses, wherein the video unit comprises a slice or a tile or a brick or a picture.

16. The method of clause 15, wherein the determining is performed at a sub-video unit level, wherein the sub-unit level corresponds to a coding unit (CU) or a transform unit (TU).

17. The method of clause 16, wherein the determining at the sub-video unit level is based on coding characteristics at the sub-unit level.

18. The method of clause 17, wherein the coding characteristics include a size of the CU and/or a size of the TU and/or a relationship between the size of the CU and the size of the TU.

19. The method of any of above clauses, wherein the conversion includes decoding the bitstream representation to generate the video unit.

20. The method of any of above clauses, wherein the conversion includes encoding the video unit into the bitstream representation.

21. A video encoder apparatus comprising one or more processors configured to implement a method recited in any one or more of above clauses.

22. A video decoder apparatus comprising one or more processors configured to implement a method recited in any one or more of above clauses.

23. A computer-readable medium having code for implementing a method described in any one or more of above clauses stored thereupon.

The second set of clauses describe certain features and aspects of the disclosed embodiments in the previous sections (e.g., items 8 to 15).

Figure 18A:
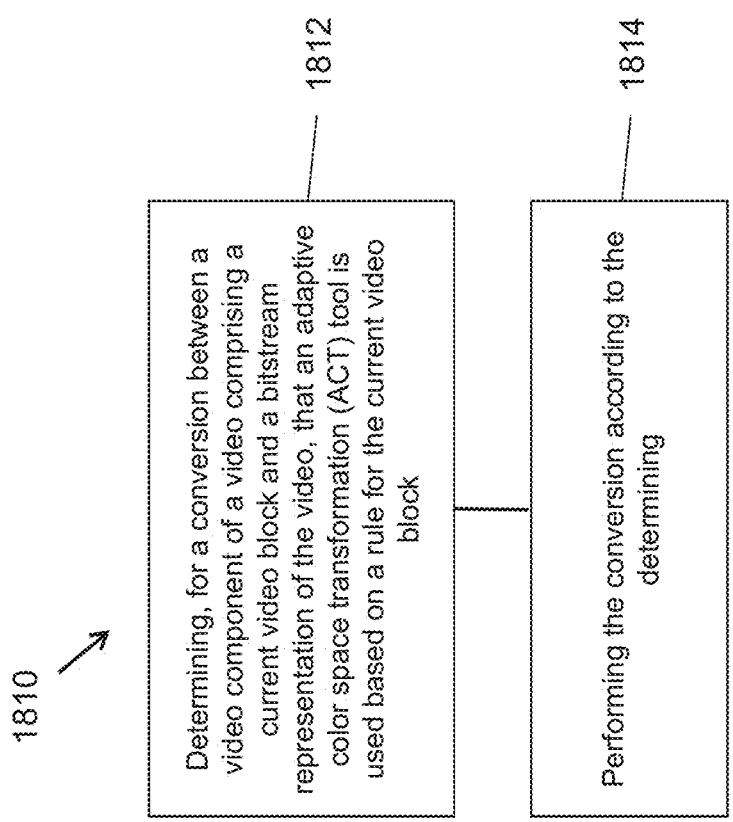

1. A method of video processing (e.g., method 1810 shown in FIG. 18A), comprising: determining 1812, for a conversion between a video component of a video comprising a current video block and a bitstream representation of the video, that an adaptive color space transformation (ACT) tool is used based on a rule for the current video block; and performing 1814 the conversion according to the determining; wherein the rule specifies to use a same constant quantization parameter (QP) offset for each of one or more color component of the current video block.

2. The method of clause 1, wherein the ACT tool includes transforming a representation of a visual signal between two color spaces.

3. The method of clause 1, wherein the rule specifies that, for a first color space, QP offsets for luma and first chroma channels are equal to K1, whereby K1 is an integer.

4. The method of clause 3, wherein the rule specifies that, a QP offset for a second channel is equal to K2, whereby K2 is an integer.

5. The method of clause 3 or 4, wherein K1 is −5 and K2 is −1.

6. The method of clause 4 or 5, wherein the first color space is a YCgCo color space, the first chroma channel is Cg channel, and the second chroma channel is Co channel 7. The method of clause 1, wherein the rule specifies that, for a first color space, a QP offset for a luma channel is equal to K1 and a QP offset for a first chroma channel is K1+O, whereby K1 and O are integers.

8. The method of clause 7, wherein K1 is −5 and O is 6.

9. The method of clause 1, wherein the rule specifies that, for a first color space, a QP offset for a luma channel is equal to K1 and a QP offset for a second channel is K1+O, whereby K1 and O are integers.

10. The method of any of clauses 7-9, wherein the rule specifies that a QP offset for a second channel is equal to K2, whereby K2 is an integer different from K1.

11. The method of clause 10, wherein K2 is 3.

12. The method of any of clauses 7 to 11, wherein the first color space is a YCgCo or YCgCo-R color space, the first chroma channel is a Cg channel, and the second chroma channel is a Co channel.

13. The method of any of clauses 7 to 11, wherein the first color space is a YCbCr color space, the first chroma channel is a Cr channel, and the second chroma channel is a Cb channel 14. The method of any of clauses 3 to 13, wherein at least one of K1, K2, or O is predefined.

15. The method of any of clauses 3 to 13, wherein at least one of K1, K2, or O is indicated in the bitstream representations at a video unit level.

16. The method of any of clauses 3 to 13, wherein at least two of K1, K2, and O is jointly coded or predictively coded.

17. The method of clause 1, wherein a QP offset for a Y color channel, a QP offset for a Co color channel, and a QP offset for a Cg color channel are indicated independently by high level syntax elements in the bitstream representation.

18. The method of clause 1, wherein a QP offsets for a Y color channel, a QP offset for a Co color channel, and a QP offset for a Cg color channel are indicated in the bitstream representation at a video unit level.

19. The method of clause 1, wherein a color transform is applied to the current video block due to use the ACT tool.

20. The method of clause 1, further comprising: determining that a transform skip process is used for the current video block; adding the QP offset to an original QP to derive updated Qp for each of color channels based on the determining; and clipping the updated QP into a predefined range.

21. The method of clause 20, wherein a same lowest allowed QP is used for deriving the updated QP for the color channels.

22. The method of clause 21, wherein the same lowest allowed QP is set to QpPrimeTsMin.

23. The method of clause 20, wherein a lowest allowed QP is independent of an applicability of the ACT tool.

24. The method of clause 23, wherein the lowest allowed QP is always set to QpPrimeTsMin.

Figure 18B:
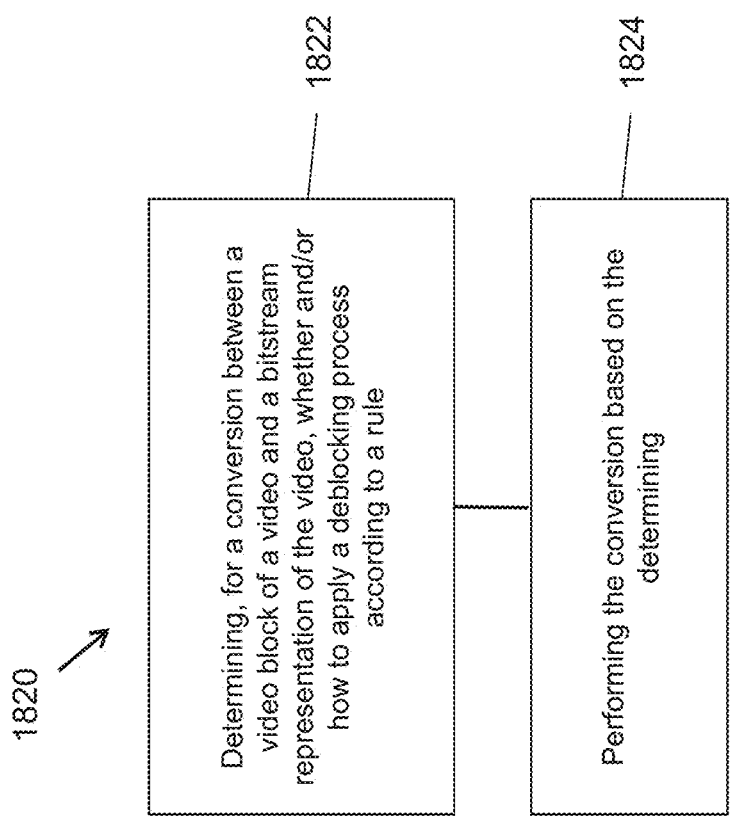

25. A method of video processing (e.g., method 1820 as shown in FIG. 18B), comprising: determining 1822, for a conversion between a video block of a video and a bitstream representation of the video, whether and/or how to apply a deblocking process according to a rule; and performing 1824 the conversion based on the determining, wherein the rule specifies that the deblocking process depends on i) an enablement status of an adaptive color space transformation (ACT) in which a representation of a visual signal is transformed between two color spaces, or ii) a color space used for representing samples of the video.

26. The method of clause 25, wherein the rule further specifies that deblocking for a first color space follows deblocking for 4:2:0 color format and that deblocking for a second color space follows deblocking for a luma component.

27. The method of clause 26, wherein the first color space corresponds to a YCoCg color space or a YCoCg-R color space and the second color space corresponds to a GBR or RGB color space.

Figure 18C:
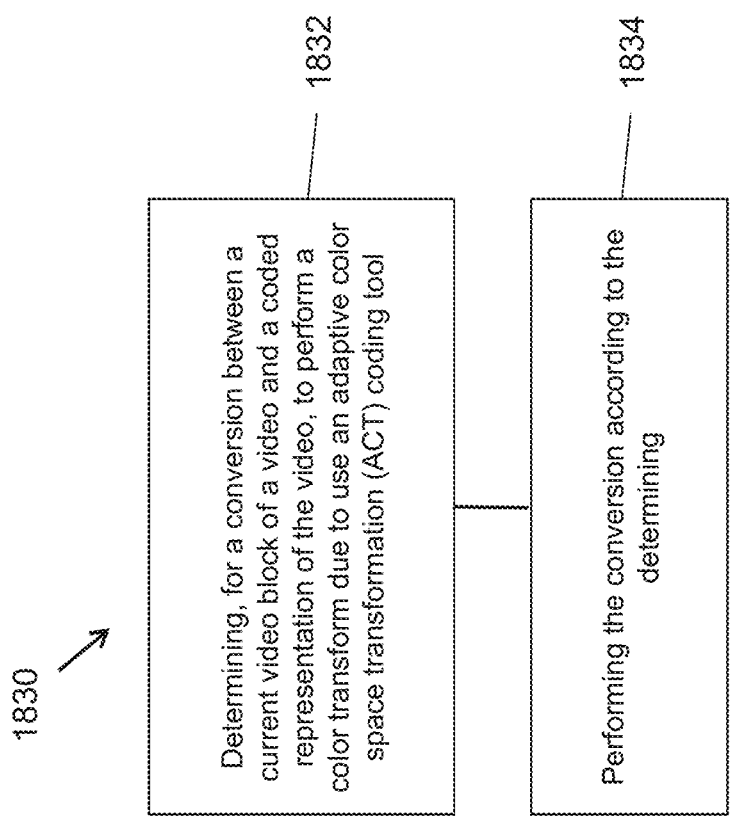

28. A method of video processing (e.g., method 1830 as shown in FIG. 18C), comprising: determining 1832, for a conversion between a current video block of a video and a coded representation of the video, to perform a color transform due to use an adaptive color space transformation (ACT) coding tool; and performing 1834 the conversion according to the determining.

29. The method of clause 28, wherein the color transform includes applying a YCoCg_R transform.

30. The method of clause 28, wherein quantization parameter (QP) offsets for Y. Co, Cg color channels are (−5, 3, 1) due to the use of the ACT coding tool.

31. The method of clause 28, wherein the rule further specifies to use a same lowest allowed QP for another video block coded using a transform skip mode.

32. The method of clause 31, wherein the lowest allowed QP is QpPrimeTsMin.

33. A method of video processing (e.g., method 1840 as shown in FIG. 18D), comprising: performing 1842 a conversion between a video including one or more video blocks and a bitstream representation of the video according to a rule, wherein the rule specifies that, for a video block coded using a transform skip mode, a lowest allowed quantization parameter (QP) is independent of an applicability of an adaptive color space transformation (ACT) tool to the video block.

34. The method of clause 33, wherein the rule further specifies that quantization parameter (QP) adjustment for the video block is added before being clipped to a given range.

35. The method of clause 33, wherein the rule further specifies that the lowest allowed QP is always QpPrimeTsMin.

36. A method of video processing, comprising: performing a conversion between a video including one or more video blocks and a bitstream representation of the video according to a rule, wherein the rule specifies that, for a video block coded using a transform skip mode, a lowest allowed quantization parameter (QP) depends on color channels.

37. The method of clause 36, wherein the rule specifies to use different lowest allowed QPs for different color channels.

38. The method of clause 36, wherein the rule specifies that a same lowest allowed QP is used for a Y channel and a Cg channel.

39. The method of any of previous clauses, wherein the rule is applied to any color spaces including a YCoCg color space, a YCbCr color space or YCoCg-R color space.

Figure 18E:
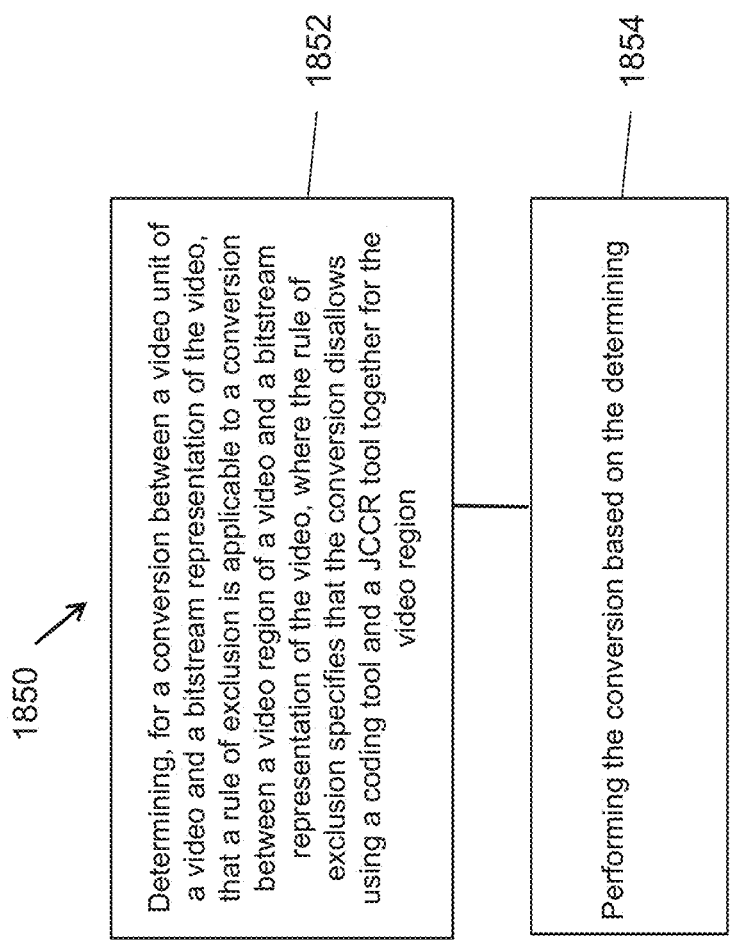

40. A method of video processing (e.g., method 1850 as shown in FIG. 18E), comprising: determining 1852 that a rule of exclusion is applicable to a conversion between a video region of a video and a bitstream representation of the video, wherein the rule of exclusion specifies that the conversion disallows using a coding tool and a joint coding of chrominance residuals (JCCR) tool together for the video region; and performing 1854 the conversion based on the determining.

41. The method of clause 40, wherein the coding tool is a transform skip mode that comprises, during encoding, coding residual of the video block without applying a non-identity transform, or during decoding, determining a decoded video block without applying a non-identity inverse transform to residuals coded in the bitstream representation.

42. The method of clause 40, wherein the coding tool is a block-based delta pulse code modulation (BDPCM) mode that corresponds to an intra-coding tool that uses a differential pulse-code modulation (DPCM) at a block level.

43. The method of clause 40, wherein the coding tool is an adaptive color space transformation (ACT) tool in which a representation of a visual signal is transformed between two color spaces.

44. The method of clause 40, wherein the bitstream representation omits an indication of usage of the JCCR tool and inferred to be disabled in case that the coding tool is enabled.

45. The method of clause 40, wherein the bitstream representation omits an indication of usage of the coding tool and inferred to be disabled in case that the JCCR tool is enabled.

Figure 18F:
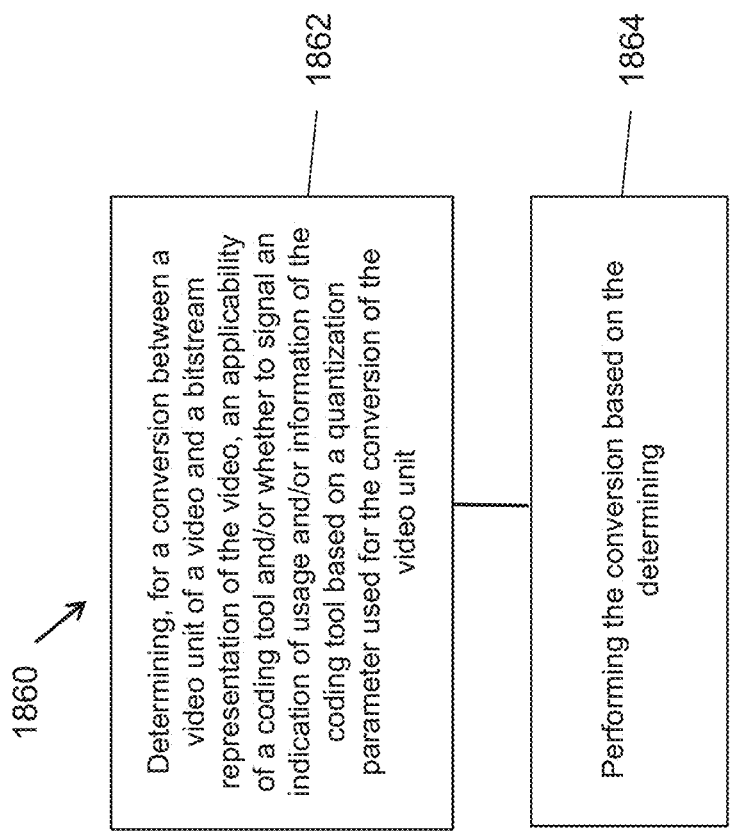

46. A method of video processing (e.g., method 1860 as shown in FIG. 18F), comprising: determining 1862, for a conversion between a video unit of a video and a bitstream representation of the video, an applicability of a coding tool and/or whether to signal an indication of usage and/or information of the coding tool based on a quantization parameter used for the conversion of the video unit; and performing 1864 the conversion based on the determining.

47. The method of clause 46, wherein the coding tool is disabled in a case that the quantization parameter is greater than or not smaller than a threshold.

48. The method of clause 46, wherein the coding tool is disabled in a case that the quantization parameter is smaller than or not greater than a threshold.

49. The method of clause 46, wherein the bitstream representation omits the indication of the usage and/or the information of the coding tool in case that the coding tool is disabled.

50. The method of clause 46, wherein the coding tool corresponds to a joint coding of chrominance residuals (JCCR) tool, a luma mapping with chroma scaling (LMCS), or an adaptive color space transformation (ACT) tool.

51. The method of any of clauses 1 to 50, wherein the conversion includes encoding the video into the bitstream representation.

52. The method of any of clauses 1 to 50, wherein the conversion includes decoding the video from the bitstream representation.

53. A video processing apparatus comprising a processor configured to implement a method recited in any one or more of clauses 1 to 52.

54. A computer readable medium storing program code that, when executed, causes a processor to implement a method recited in any one or more of clauses 1 to 52.

55. A computer readable medium that stores a coded representation or a bitstream representation generated according to any of the above described methods.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this disclosure contains many specifics, these should not be construed as limitations on the scope of any invention or of what may be claimed, but rather as descriptions of features that may be specific to particular embodiments of particular inventions. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this disclosure should not be understood as requiring such separation in all embodiments.

Only a few implementations and examples are described and other implementations, enhancements and variations can be made based on what is described and illustrated in this disclosure.

What is claimed is:

1. A method of processing video data, comprising:
determining, for a conversion between a video comprising a current video block and a bitstream of the video, that a first coding tool is used based on a rule for the current video block; and
performing the conversion according to the determining,
wherein the first coding tool includes transforming a representation of a visual signal between two color spaces, and
wherein the rule specifies that a first quantization parameter offset for a luma channel of the current video block is equal to K1 and a second quantization parameter offset for a first chroma channel of the current video block is K1+O, whereby K1 and O are integers.

2. The method of claim 1, wherein K1 is −5 and O is 6.

3. The method of claim 1, wherein a third quantization parameter offset for a second chroma channel of the current video block is equal to 3.

4. The method of claim 1, wherein the rule further specifies to use a same lowest allowed quantization parameter for all video blocks coded using a transform skip mode of the video.

5. The method of claim 4, wherein the lowest allowed quantization parameter is independent of whether the first coding tool is applied to a video block coded using the transform skip mode.

6. The method of claim 1, wherein the rule further specifies that the first quantization parameter offset for the luma channel of the current video block or the second quantization parameter offset for the first chroma channel of the current video block is added before a quantization parameter being clipped to a given range.

7. The method of claim 1, wherein the current video block is in any color spaces including a YCoCg color space, a YCbCr color space or a YCoCg-R color space.

8. The method of claim 1, wherein when the current video block is in a YCgCo or a YCgCo-R color space, the first chroma channel is a Cg channel.

9. The method of claim 1, wherein the conversion includes encoding the video into the bitstream.

10. The method of claim 1, wherein the conversion includes decoding the video from the bitstream.

11. An apparatus for processing video data comprising a processor and a non-transitory memory with instructions thereon, wherein the instructions upon execution by the processor, cause the processor to:
- determine, for a conversion between a video comprising a current video block and a bitstream of the video, that a first coding tool is used based on a rule for the current video block; and
- perform the conversion according to the determination,
- wherein the first coding tool includes transforming a representation of a visual signal between two color spaces, and
- wherein the rule specifies that a first quantization parameter offset for a luma channel of the current video block is equal to K1 and a second quantization parameter offset for a first chroma channel of the current video block is K1+O, whereby K1 and O are integers.

12. The apparatus of claim 11, wherein K1 is −5 and O is 6, and wherein a third quantization parameter offset for a second chroma channel of the current video block is equal to 3.

13. The apparatus of claim 11, wherein the rule further specifies to use a same lowest allowed quantization parameter for all video blocks coded using a transform skip mode of the video,
- wherein the lowest allowed quantization parameter is independent of whether the first coding tool is applied to a video block coded using the transform skip mode, and
- wherein the rule further specifies that the first quantization parameter offset for the luma channel of the current video block or the second quantization parameter offset for the first chroma channel of the current video block is added before a quantization parameter being clipped to a given range.

14. The apparatus of claim 11, wherein the current video block is in any color spaces including a YCoCg color space, a YCbCr color space or a YCoCg-R color space, and wherein when the current video block is in a YCgCo or a YCgCo-R color space, the first chroma channel is a Cg channel.

15. A non-transitory computer-readable storage medium storing instructions that cause a processor to:
- determine, for a conversion between a video comprising a current video block and a bitstream of the video, that a first coding tool is used based on a rule for the current video block; and
- perform the conversion according to the determination,
- wherein the first coding tool includes transforming a representation of a visual signal between two color spaces, and
- wherein the rule specifies that a first quantization parameter offset for a luma channel of the current video block is equal to K1 and a second quantization parameter offset for a first chroma channel of the current video block is K1+O, whereby K1 and O are integers.

16. The non-transitory computer-readable storage medium of claim 15, wherein K1 is −5 and O is 6, and wherein a third quantization parameter offset for a second chroma channel of the current video block is equal to 3.

17. The non-transitory computer-readable storage medium of claim 15, wherein the rule further specifies to use a same lowest allowed quantization parameter for all video blocks coded using a transform skip mode of the video,
- wherein the lowest allowed quantization parameter is independent of whether the first coding tool is applied to a video block coded using the transform skip mode,
- wherein the rule further specifies that the first quantization parameter offset for the luma channel of the current video block or the second quantization parameter offset for the first chroma channel of the current video block is added before a quantization parameter being clipped to a given range,
- wherein the current video block is in any color spaces including a YCoCg color space, a YCbCr color space or a YCoCg-R color space, and
- wherein when the current video block is in a YCgCo or a YCgCo-R color space, the first chroma channel is a Cg channel.

18. A non-transitory computer-readable recording medium storing a bitstream of a video which is generated by a method performed by a video processing apparatus, wherein the method comprises:
- determining, for a video comprising a current video block, that a first coding tool is used based on a rule for the current video block; and
- generating the bitstream according to the determining,
- wherein the first coding tool includes transforming a representation of a visual signal between two color spaces, and
- wherein the rule specifies that a first quantization parameter offset for a luma channel of the current video block is equal to K1 and a second quantization parameter offset for a first chroma channel of the current video block is K1+O, whereby K1 and O are integers.

19. The non-transitory computer-readable recording medium of claim 18, wherein K1 is −5 and O is 6, and wherein a third quantization parameter offset for a second chroma channel of the current video block is equal to 3.

20. The non-transitory computer-readable recording medium of claim 18, wherein the rule further specifies to use a same lowest allowed quantization parameter for all video blocks coded using a transform skip mode of the video,
- wherein the lowest allowed quantization parameter is independent of whether the first coding tool is applied to a video block coded using the transform skip mode,
- wherein the rule further specifies that the first quantization parameter offset for the luma channel of the current video block or the second quantization parameter offset for the first chroma channel of the current video block is added before a quantization parameter being clipped to a given range,
- wherein the current video block is in any color spaces including a YCoCg color space, a YCbCr color space or a YCoCg-R color space, and
- wherein when the current video block is in a YCgCo or a YCgCo-R color space, the first chroma channel is a Cg channel.

* * * * *